United States Patent
Schaefer et al.

(10) Patent No.: US 11,966,671 B2
(45) Date of Patent: Apr. 23, 2024

(54) METHOD FOR DETERMINING NOODLE AND INTERFACE RESIDUAL STRESSES AND PROPERTIES UNDER HYGROTHERMAL-MECHANICAL LOADINGS

(71) Applicant: The Boeing Company, Chicago, IL (US)

(72) Inventors: Joseph D. Schaefer, St. Louis, MO (US); Brian P. Justusson, Saint Peters, MO (US)

(73) Assignee: THE BOEING COMPANY, Arlington, VA (US)

(*) Notice: Subject to any disclaimer, the term of this patent is extended or adjusted under 35 U.S.C. 154(b) by 296 days.

(21) Appl. No.: 16/207,254

(22) Filed: Dec. 3, 2018

(65) Prior Publication Data

US 2020/0175127 A1 Jun. 4, 2020

(51) Int. Cl.
*G06F 30/23* (2020.01)
*G06F 111/10* (2020.01)
*G06F 111/20* (2020.01)

(52) U.S. Cl.
CPC .......... *G06F 30/23* (2020.01); *G06F 2111/10* (2020.01); *G06F 2111/20* (2020.01)

(58) Field of Classification Search
CPC .......... G06F 30/20; G06F 30/23; G06F 30/15; G06F 2111/20; G06F 2111/10
See application file for complete search history.

(56) References Cited

U.S. PATENT DOCUMENTS

| | | | |
|---|---|---|---|
| 5,136,497 A * | 8/1992 | Coe | G05B 17/02 703/2 |
| 6,562,436 B2 * | 5/2003 | George | B32B 5/12 428/105 |
| 7,505,885 B2 | 3/2009 | Deobald et al. | |
| 8,568,545 B2 | 10/2013 | Lindgren et al. | |
| 9,020,786 B2 | 4/2015 | Rassaian et al. | |
| 9,194,769 B1 | 11/2015 | Senibi et al. | |
| 9,506,836 B2 | 11/2016 | Pado et al. | |
| 9,852,237 B2 | 12/2017 | Gabrys et al. | |
| 2004/0148143 A1 | 7/2004 | Deobald et al. | |

(Continued)

FOREIGN PATENT DOCUMENTS

| | | |
|---|---|---|
| EP | 3264297 A1 | 1/2018 |
| WO | 2018093871 A1 | 5/2018 |

OTHER PUBLICATIONS

Lee, J-W., and Isaac M. Daniel. "Progressive transverse cracking of crossply composite laminates." Journal of Composite Materials 24.11 (1990): 1225-1243. (Year: 1990).*

(Continued)

*Primary Examiner* — Boris Gorney
*Assistant Examiner* — David A Hopkins
(74) *Attorney, Agent, or Firm* — COATS & BENNETT, PLLC

(57) ABSTRACT

A computer is configured to generate a computer model predicting the progressive creation, density, and spacing of a plurality of cracks in a filler material, such as a "noodle," for example, disposed at a connection interface between a load-bearing composite structural component, such as a stringer or a spar, for example, and the structural framework of a vehicle on which those structural components are utilized.

20 Claims, 21 Drawing Sheets

(56) References Cited

U.S. PATENT DOCUMENTS

| | | | |
|---|---|---|---|
| 2011/0077918 | A1 | 3/2011 | Mutlu et al. |
| 2015/0217508 | A1* | 8/2015 | Rossi ................... B29C 33/448 428/80 |
| 2016/0023431 | A1* | 1/2016 | Zarfos ..................... B32B 37/18 428/113 |
| 2016/0082694 | A1* | 3/2016 | Griess ................... B29C 64/141 428/114 |
| 2016/0144558 | A1* | 5/2016 | Vetter ............... B29C 66/02241 428/113 |
| 2016/0224698 | A1 | 8/2016 | Rassaian et al. |
| 2016/0303776 | A1* | 10/2016 | Oefner ............... B29D 99/0046 |
| 2017/0029579 | A1* | 2/2017 | Song ....................... B32B 27/28 |
| 2017/0059742 | A1 | 3/2017 | Mookanahallipatna Ramasesha et al. |
| 2017/0219469 | A1 | 8/2017 | Gu |
| 2018/0004889 | A1 | 1/2018 | Mabson et al. |
| 2018/0093431 | A1* | 4/2018 | Forston .................... B32B 5/26 |

OTHER PUBLICATIONS

Van der Meer, Frans P., and Carlos G. Dávila. "Cohesive modeling of transverse cracking in laminates under in-plane loading with a single layer of elements per ply." International Journal of Solids and Structures 50.20-21 (2013): 3308-3318. (Year: 2013).*

Sgambitterra, G., et al. "A robust three-node shell element for laminated composites with matrix damage." Composites Part B: Engineering 42.1 (2011): 41-50. (Year: 2011).*

Gururaja, Suhasini, and Md Alauddin Ansari. "Delamination Modeling in Noodle Region of Composite T-Joints." 54th AIAA/ASME/ASCE/AHS/ASC Structures, Structural Dynamics, and Materials Conference. 2013. (Year: 2013).*

Burns, L., et al. "Strengthening of composite T-joints using novel ply design approaches." Composites Part B: Engineering 88 (2016): 73-84. (Year: 2016).*

Cairns, Douglas, et al. "Fracture of skin/stiffener intersections in composite wind turbine structures." 1998 ASME Wind Energy Symposium. 1998. (Year: 1998).*

Chen, Jiye, and Dominic Fox. "Numerical investigation into multi-delamination failure of composite T-piece specimens under mixed mode loading using a modified cohesive model." Composite Structures 94.6 (2012): 2010-2016. (Year: 2012).*

Chen, Jiye. "Simulation of multi-directional crack growth in braided composite T-piece specimens using cohesive models." Fatigue & Fracture of Engineering Materials & Structures 34.2 (2011): 123-130. (Year: 2011).*

Davies, G. A. O., D. Hitchings, and J. Ankersen. "Predicting delamination and debonding in modern aerospace composite structures." Composites Science and Technology 66.6 (2006): 846-854. (Year: 2006).*

Davies, G. A. O., and J. Ankersen. "Virtual testing of realistic aerospace composite structures." Journal of materials science 43.20 (2008): 6586-6592. (Year: 2008).*

Gülaşik, Hasan. Modeling of mixed-mode delamination in composite t-joints. MS thesis. 2014. (Year: 2014).*

Hélénon, F., et al. "Numerical investigation into failure of laminated composite T-piece specimens under tensile loading." Composites Part A: Applied Science and Manufacturing 43.7 (2012): 1017-1027. (Year: 2012).*

Hisada, Shinsaku, Shu Minakuchi, and Nobuo Takeda. "Cure-induced strain and failure in deltoid of composite T-joints." Composites Part A: Applied Science and Manufacturing 141: 106210. (Year: 2021).*

Jalalvand, Meisam, Gergely Czél, and Michael R. Wisnom. "Damage analysis of pseudo-ductile thin-ply UD hybrid composites—a new analytical method." Composites Part A: Applied Science and Manufacturing 69 (2015): 83-93. (Year: 2015).*

Ji, Shaocheng, and Kazuko Saruwatari. "A revised model for the relationship between joint spacing and layer thickness." Journal of Structural Geology 20.11 (1998): 1495-1508. (Year: 1998).*

Johnston, Patrick H. "Ultrasonic nondestructive evaluation of PRSEUS pressure cube article in support of load test to failure." (2013). (Year: 2013).*

Kim, Y. W., and Chang Sun Hong. "Progressive failure model for the analysis of laminated composites based on finite element approach." Journal of reinforced plastics and composites 11.10 (1992): 1078-1092. (Year: 1992).*

Li, Jun, et al. "Curing deformation analysis for the composite T-shaped integrated structures." Applied Composite Materials 15.4-6 (2008): 207-225. (Year: 2008).*

Ma, Xueshi, et al. "A numerical and experimental study on the multiple fracture progression of CFRP T-joints under pull-off load." International Journal of Mechanical Sciences 177 (2020): 105541. (Year: 2020).*

Maimi, P., et al. "Numerical modeling of matrix cracking and intralaminar failure in advanced composite materials." Numerical Modelling of Failure in Advanced Composite Materials. Woodhead Publishing, 2015. 175-192. (Year: 2015).*

Abdul Majid, M. S., et al. "Strain response and damage modelling of glass/epoxy pipes under various stress ratios." Plastics, Rubber and Composites 43.9 (2014): 290-299. (Year: 2014).*

McManus, Hugh L., David E. Bowles, and Stephen S. Tompkins. "Prediction of thermal cycling induced matrix cracking." Journal of reinforced plastics and composites 15.2 (1996): 124-140. (Year: 1996).*

O'Brien, T. Kevin. "Characterization of delamination onset and growth in a composite laminate." Damage in composite materials: basic mechanisms, accumulation, tolerance, and characterization. ASTM International, 1982. (Year: 1982).*

Patel, Sneha Ramesh. Durability of Advanced Woven Composites in Aerospace Applications. Diss. Virginia Tech, 1999. (Year: 1999).*

Sápi, Zsombor, Richard Butler, and Andrew Rhead. "Filler materials in composite out-of-plane joints—A review." Composite Structures 207 (2019): 787-800. (Year: 2019).*

Sun, C. T., and Jianxin Tao. "Prediction of failure envelopes and stress/strain behaviour of composite laminates." Composites Science and technology 58.7 (1998): 1125-1136. (Year: 1998).*

Yang, Q. D., et al. "Failure in the junction region of T-stiffeners: 3D-braided vs. 2D tape laminate stiffeners." International journal of solids and structures 40.7 (2003): 1653-1668. (Year: 2003).*

Zhang, H., et al. "Experimental analysis for the flaws caused by fiber insertion and stitching in 3D preformed T-joint carbon fiber reinforced polymer composites using X-ray micro-computed tomography." (2017). (Year: 2017).*

Selezneva, Marina, et al. "Analytical model for prediction of strength and fracture paths characteristic to randomly oriented strand (ROS) composites." Composites Part B: Engineering 96 (2016): 103-111. (Year: 2016).*

Selezneva, Marina, et al. "Modelling of mechanical properties of randomly oriented strand thermoplastic composites." Journal of Composite Materials 51.6 (2017): 831-845. (Year: 2017).*

Tay, T. E., et al. "Progressive failure analysis of composites." Journal of Composite Materials 42.18 (2008): 1921-1966. (Year: 2008).*

Wisnom, M. R. "Modelling discrete failures in composites with interface elements." Composites Part A: Applied Science and Manufacturing 41.7 (2010): 795-805. (Year: 2010).*

Xiao, J. R., B. A. Gama, and J. W. Gillespie Jr. "Progressive damage and delamination in plain weave S-2 glass/SC-15 composites under quasi-static punch-shear loading." Composite structures 78.2 (2007): 182-196. (Year: 2007).*

Schuecker, Clara, Carlos G. Dávila, and Cheryl A. Rose. "Comparison of damage models for predicting the non-linear response of laminates under matrix dominated loading conditions." (2010). (Year: 2010).*

Barbero, Ever J., and Javier Cabrera Barbero. "Determination of material properties for progressive damage analysis of carbon/epoxy laminates." Mechanics of advanced materials and structures 26.11 (2019): 938-947. (Year: 2019).*

YouTube Video, Title: "Damage of Fiber Reinforced Composites | ANSYS e-Learning | CAE Associates"; Publication Date: Jul. 28, 2014 (Year: 2014).*

(56) References Cited

OTHER PUBLICATIONS

Airoldi, Alessandro, and Carlos G. Dávila. "Identification of material parameters for modelling delamination in the presence of fibre bridging." Composite Structures 94.11 (2012): 3240-3249. (Year: 2012).*

Brewer, John C., and Paul A. Lagace. "Quadratic stress criterion for initiation of delamination." Journal of composite materials 22.12 (1988): 1141-1155. (Year: 1988).*

Fenske, Matthew T., and Anthony J. Vizzini. "The inclusion of in-plane stresses in delamination criteria." Journal of Composite Materials 35.15 (2001): 1325-1342. (Year: 2001).*

AutoDesk, "Thermal Residual Stresses", Article on AutoDesk Knowledge Network, Published Apr. 23, 2018, URL: knowledge(dot)autodesk(dot)com/support/helius-pfa/learn-explore/caas/CloudHelp/cloudhelp/2019/ENU/ACMPAN/files/GUID-A0AD854B-438A-4433-A000-B25DEDC9EF57-htm(dot)html (Year: 2018).*

Campilho, Raul DSG, M. F. S. F. De Moura, and J. J. M. S. Domingues. "Modelling single and double-lap repairs on composite materials." Composites Science and Technology 65.13 (2005): 1948-1958. See the abstract, see fig. 1 and § 2, then see §§ 4.1-4.2 (Year: 2005).*

Turon, A., et al. "Accurate simulation of delamination growth under mixed-mode loading using cohesive elements: Definition of interlaminar strengths and elastic stiffness." Composite structures 92.8 (2010): 1857-1864. See the abstract, see §§ 3, 4-4.1, and 5. (Year: 2010).*

English, Shawn A., Timothy M. Briggs, and Stacy M. Nelson. "Quantitative validation of carbon-fiber laminate low velocity impact simulations." Composite Structures 135 (2016): 250-261. See the abstract and p. 251, col. 2. (Year: 2016).*

Garcea, S. C., Ying Wang, and P. J. Withers. "X-ray computed tomography of polymer composites." Composites Science and Technology 156 (2018): 305-319. See the abstract. (Year: 2018).*

Ullah, Himayat, Andy R. Harland, and Vadim V. Silberschmidt. "Evolution and interaction of damage modes in fabric-reinforced composites under dynamic flexural loading." Composites Science and Technology 92 (2014): 55-63. See the abstract and p. 60. (Year: 2014).*

Scott, A. et al., "In Situ Fibre Fracture Measurement in Carbon-Epoxy Laminates Using High Resolution Computed Tomography", Composites Science and Technology, vol. 71, Jun. 10, 2011, pp. 1471-1477, Elsevier.

McGuigan, A. et al., "An Elastic-Plastic Shear Lag Model for Fracture of Layered Coatings", Thin Solid Films, vol. 424, Jan. 1, 2003, pp. 219-223, Elsevier.

Joffe, R. et al., "Analytical Modeling of Stiffness Reduction in Symmetric and Balanced Laminates Due to Cracks in 90° Layers", Composites Science and Technology, vol. 59, Jan. 8, 1999, pp. 1641-1652, Elsevier.

Bassam, F. et al., "On the Behaviour of the Residual Strain Produced by Matrix Cracking in Cross-Ply Laminates", Composites Part A, vol. 29A, Jan. 27, 1998, pp. 1425-1432, Elsevier.

Chinese Office Action dated Sep. 5, 2023 in re Chinese Application No. 201911219994.5 filed Dec. 3, 2019.

\* cited by examiner

METHOD FOR DETERMINING NOODLE AND INTERFACE RESIDUAL STRESSES AND PROPERTIES UNDER HYGROTHERMAL-MECHANICAL LOADINGS

TECHNICAL FIELD

The present disclosure relates generally to computer devices, and particularly to computer devices configured to predict cracks in an interface between a composite material and a structural component of a vehicle by modeling the effects of initial and subsequent stresses on the interface.

BACKGROUND

The aerospace industry utilizes load-bearing components when designing and building a structure or vehicle to increase its strength and stability. Consider, for example, the structural framework of an aircraft. The fuselage of an aircraft typically includes composite load-bearing components called "stringers" that run longitudinally along the length of the fuselage. Typically, stringers comprises a flange, a web, and a cap (also referred to as the stringer 'hat'), and is connected either to a base charge or directly to the skin of the aircraft. The wings of the aircraft also include "stringers" running between structural ribs from the "root" of the wing, where it attaches to the fuselage, to the tip of the wing. Regardless of their particular placement and attachment to the aircraft, however, stringers transfer loads acting on the "skin" of the airplane to the frame of the airplane, while also providing strength and stiffness to the airframe.

Composite stringers can have various sizes and profiles, such as those typically referred to as "I," "L," "blade," and "C" profiles. Often times, however, the profile of a stringer can cause a void to be created at a seam between the base and the cap of the stringer. These voids can undesirably weaken the interface between the stringer and the structural framework of the aircraft. Therefore, "noodles" (e.g., fillers) comprised of a composite or adhesive material are inserted into the voids to help strengthen the interface.

BRIEF SUMMARY

Aspects of the present disclosure relate to an apparatus, a corresponding method, and a corresponding non-transitory computer-readable medium configured to generate a computer model that predicts the progressive creation, density, and spacing, of multiple cracks in a filler material (e.g., a "noodle") disposed at a connection interface that exists between a load-bearing composite structural component of a vehicle and the structural frame of a vehicle.

In one aspect, a computer is configured to determine progressive cracking in a connection interface between composite components. The computer comprises a communication interface circuit and processing circuitry. The communication interface circuit is configured to communicate data with a remote device via a communications network. The processing circuitry is operatively connected to the communication interface circuit, and is configured to calculate a spacing requirement for predicted cracks in a connection interface between first and second composite components, wherein the spacing requirement defines an average spacing between the predicted cracks in the connection interface, generate a computer model of the connection interface as a function of the spacing requirement and one or more loads to be applied to the connection interface, wherein the computer model indicates the progressive cracking in the connection interface between composite components, and output the computer model for a user.

In one aspect, the processing circuitry is further configured to generate the computer model to indicate a density of the predicted cracks in the connection interface.

In one aspect, the processing circuitry is further configured to generate a visual representation of the computer model, which graphically indicates the progressive cracking in the connection interface between composite components, and output the visual representation of the computer model to a display device for a user.

In one aspect, the processing circuitry is configured to output the computer model as input into a finite element method (FEM) function executing on a computing device.

In such aspects, the processing circuitry is further configured to update a mesh of the FEM function based on the computer model.

In one aspect, to determine the crack density requirement, the processing circuitry is configured to determine a density requirement for the predicted cracks in the connection interface, wherein the density requirement defines a number of the predicted cracks in the connection interface, and calculate the spacing requirement based on the density requirement.

In such aspects, the processing circuitry is further configured to calculate the spacing requirement based on a residual stress applied to the connection interface during a curing process.

In one aspect, the connection interface comprises a filler material having an Interlaminar Shear (ILS) strength. In these aspects, the processing circuitry is configured to generate the computer model as a function of the ILS strength of the filler material.

In these aspects, the processing circuitry is configured to compare the density of the predicted cracks in the computer model of the connection interface to a baseline crack density, modify the ILS strength of the filler material responsive to determining that the density of the predicted cracks does not match the baseline crack density, and generate a refined computer model of the connection interface based on the modified ILS strength of the filler material. The refined computer model indicates the placement and the density of the predicted cracks in the connection interface according to the modified ILS strength of the filler material.

In another aspect, the present disclosure provides a corresponding method for determining progressive cracking in a connection interface between composite components. In these aspects, the method comprises calculating a spacing requirement for predicted cracks in a connection interface between first and second composite components, wherein the spacing requirement defines an average spacing between the predicted cracks in the connection interface, generating a computer model of the connection interface as a function of the spacing requirement and one or more loads to be applied to the connection interface, wherein the computer model indicates the progressive cracking in the connection interface between composite components, and outputting the computer model for a user.

In one aspect, the computer model further indicates a density of the predicted cracks in the connection interface.

In one aspect, outputting the computer model for a user comprises outputting a visual representation of the computer model to a display for a user. The visual representation of the computer model graphically indicates the progressive cracking in the connection interface between composite components.

In one aspect, outputting the computer model for a user comprises outputting the computer model as input into a finite element method (FEM) function executing on a computing device.

In one aspect, the method further comprises refining a mesh of the FEM function based on the computer model.

In such aspects, determining a spacing requirement for the predicted cracks comprises determining a density requirement for the predicted cracks in the connection interface, wherein the density requirement defines a number of the predicted cracks in the connection interface, and calculating the spacing requirement based on the density requirement.

In one aspect, the method further comprises calculating the spacing requirement based on a residual stress exerted on the connection interface during a curing process.

In one aspect, the connection interface comprises a filler material having an Interlaminar Shear (ILS) strength. In these aspects, generating the computer model of the connection interface further comprises generating the computer model as a function of the ILS strength of the filler material.

In one aspect, the method further comprises comparing the density of the predicted cracks in the computer model of the connection interface to a baseline crack density, modifying the ILS strength of the filler material responsive to determining that the density of the predicted cracks does not match the baseline crack density, and generating a refined computer model of the connection interface as a function of the modified ILS strength of the filler material, wherein the refined computer model indicates the progressive cracking in the connection interface between composite components and the density of the predicted cracks in the connection interface according to the modified ILS strength of the filler material.

In one aspect, at least one of the one or more loads to be applied to the connection interface comprises one or both of a residual stress exerted on the connection interface during a curing process, and a mechanical load exerted on the connection interface.

In one aspect, the present disclosure also provides a corresponding non-transitory computer-readable medium comprising instructions stored thereon that, when executed by processing circuitry of a computing device, configure the computing device to calculating a spacing requirement for predicted cracks in a connection interface between first and second composite components, wherein the spacing requirement defines an average spacing between the predicted cracks in the connection interface, generate a computer model of the connection interface as a function of the spacing requirement and one or more loads to be applied to the connection interface, wherein the computer model indicates the progressive cracking in the connection interface between composite components and a density of the predicted cracks in the connection interface, and output the computer model for a user.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1A:
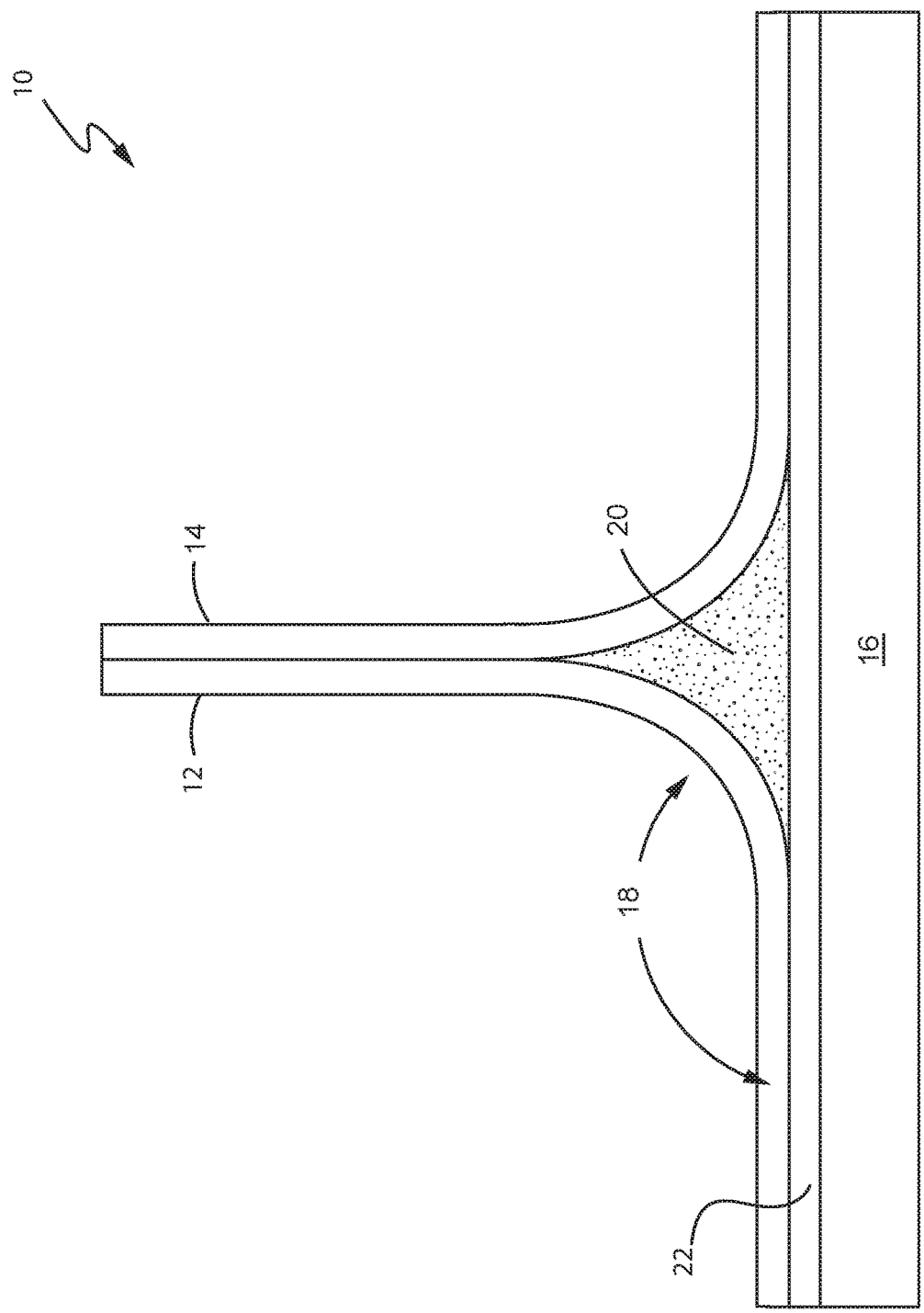
FIGS. 1A-1B illustrate cross-sections of some example composite stringers attached to a structural framework of a vehicle, as well as a composite filler material inserted into a void areas between the composite stringer and the structural framework according to one aspect of the present disclosure.

Aspects of the present disclosure configure a computer to model the effects of initial and residual stresses and loads exerted on a composite or adhesive filler material, such as a "noodle," for example, disposed at a connection interface of a load-bearing composite structural component (e.g., "stringers," and "spars") and the structural framework of a vehicle. By modeling the stresses and loads, aspects of the present disclosure configure the computer to predict the progressive creation, density, and spacing, of cracks that can appear in such filler materials as a result of such stresses and loads.

In more detail, cracks appear at the connection interfaces (e.g., in the noodle), usually progressively, due to the amount and types of stresses and loads that are exerted on the connection interface. The stresses particularly include the initial and residual stresses exerted on the filler material at connection interface due to the curing process during the manufacture of the vehicle, as well as the thermal and mechanical stresses that are subsequently exerted on the filler material and connection interface. Some exemplary stresses include, but are not limited to, thermal stresses, such as residual stresses due to the curing process and stresses due to temperature loading at an environment of interest, moisture/hygric stresses due to an environment of interest, and static/fatigue stresses such as those that are due to mechanical loading.

As previously stated, the aerospace industry utilizes these load-bearing structural components to increase the strength and stability of a structure or vehicle. Consider, for example, the wing an aircraft. Current wing designs utilize composite stringers having relatively large cross-sections, which can create larger "voids" between the stringers and the structural framework of the wing. In turn, a greater amount of a filler material (e.g., a larger-sized noodle) is required to fill these voids. However, larger noodles are more susceptible to cracking due to the residual stresses induced during the curing process. Multiple designs (e.g., rolled unidirectional, laminate, adhesive, and laminate) have been attempted in order to develop an optimal noodle design. Nevertheless, multiple significant challenges remain.

By way of example only, an optimal design for a noodle (or other type of filler material inserted into a void at a connection interface between a stringer and the structural framework of a vehicle) should consider the effects of:

Residual thermal stress induced on the noodle due to a cure cycle;
How a geometry of the noodle effects the concentration of stresses and loads on the noodle and surrounding region;
The interfacial shear stress exerted at the connection interface between the noodle and a composite structural component (e.g., a stringer);
The interfacial shear strength (ISS) at the connection interface between the noodle and a composite structural component (e.g., a stringer);
The interfacial fracture toughness Gc at a connection interface between a noodle and a composite structure such as a stringer (i.e., the mechanical energy per unit interfacial area at which a fracture, such as delamination, occurs); and
The characterization for progressive cracking in the noodle (i.e., what happens with respect to subsequent cracking in the noodle after the onset of the initial crack or damage to the noodle).

However, conventional approaches for analyzing the stresses and loads on noodles are based on a limited set of parameters. Therefore, the results that these conventional methods produce are similarly limited and not as accurate as they can be. For example, conventional approaches estimate changes in thermal stresses (aΔT) based on an assumed stress-free temperature during a cure cycle. Stresses due to loading are then added to a finite element analysis (FEM) of the noodle interface. However, this approach is limited in the accuracy of the information it can provide. Particularly, it is not able to accurately estimate the starting residual stress state in the presence of additional loadings, such as thermal loads and moisture loads, or capture the interactive/coupled effects associated with subsequent mechanical loads on the noodle.

Another disadvantage of conventional approaches is that they work well only for a material filler at a certain type of connection interface—i.e., an interface where a stringer connects to a structural framework of a vehicle via an adhesive tape material. Modern vehicles (e.g., aircraft), however, also utilize other filler materials at connection interfaces. These include, but are not limited to, noodles that are inserted into the voids created at the connection interfaces. In these cases, conventional methods for analyzing the effects of the stresses and loads on the connection interface are inadequate. These include the connection interfaces associated with a "unitized composite structure," which is the design direction in which the aerospace industry is headed. Connection interfaces of this type are integrated into the vehicle's structural framework and include, but are not limited to, composite-metal interfaces, tape-fabric interfaces, carbon tape-glass fabric interfaces, and the like.

Moreover, the inputs for interfacial strength and toughness for cohesive elements associated with current modeling techniques (e.g., FEM/Computational/Advanced Progressive Damage and Failure Analysis, etc.) are based on current industry standards. One such standard is detailed in "ASTM D3846-08(2015) Standard Test Method for In-Plane Shear Strength of Reinforced Plastics." Other standards, however, include, but may not be limited to, the standards commonly referred to as ASTM D2344, ASTM D695, and ASTM D6415/D6425M. Regardless of the standard, though, each is used to obtain a single strength value/property for cohesive elements. However, all have the same issue. That is, such inputs enable the models to account only for a single, local failure event—e.g., an initial crack appearing in a noodle due to a stress. They do not enable current techniques to characterize the progressive cracking that occurs in a noodle due to the initial and residual stresses that are typically exerted on the noodle. Further, no standard tests currently exist that are able to capture such progressive cracking in the presence of realistic material loads.

Aspects of the present disclosure, however, accurately model a noodle by considering parameters, such as the physics of the connection interface, in addition to the materials being joined by the filler material, the environmental and mechanical loadings exerted on the connection interface, and the geometry of the connection interface. More particularly, aspects of the present disclosure configure a computer not only to predict an initial crack in a noodle, but also to predict whether multiple cracks will progressively appear in the noodle due to a variety of different stresses and loads exerted on the noodle and on the region surrounding the noodle. Additionally, aspects of the present disclosure configure the computer to predict a density and spacing of any such progressive cracks in the noodle, thereby providing a more accurate model of a given noodle. This model can then be input into a Finite Element Method (FEM) analysis, and/or output as a visual representation of the connection interface to a display device. So informed, designers and manufacturers are able to design and manufacture aircraft and other vehicles that are stronger and more stable in a more cost efficient manner, thereby leading to increased safety and confidence for end consumers.

Figure 1B:
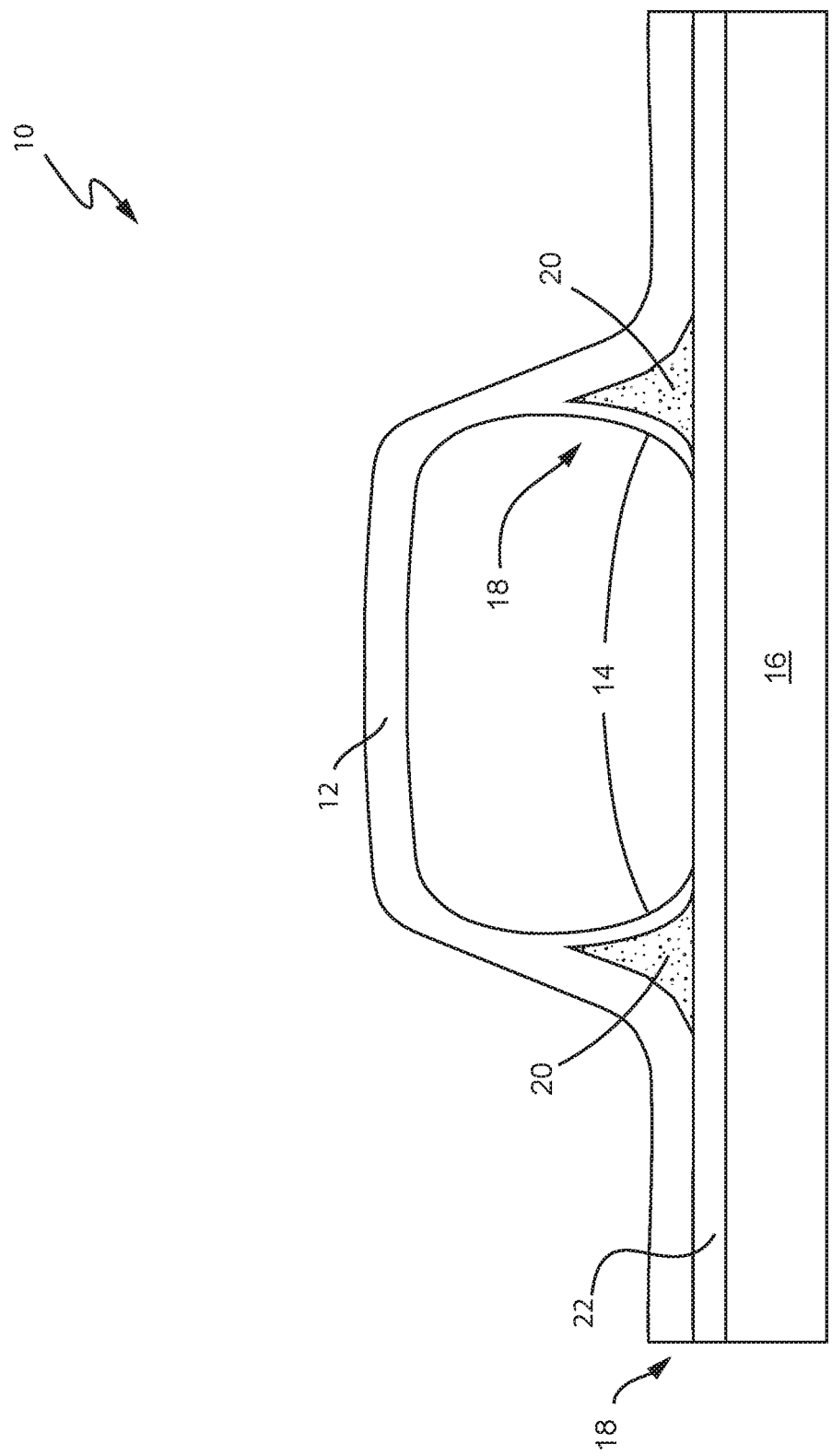

Turning now to the drawings, FIGS. 1A-1B illustrate some exemplary types of stringers 10 connected to the structural frame of an aircraft according to aspects of the present disclosure. Those of ordinary skill in the art should appreciate that the illustration of the particular stringers is for illustrative purposes only. Aspects of the present disclosure are equally as suitable for modeling the connection interfaces associated with other types of stringers, as well as the connection interfaces associated with other types of composite structural components, such as spars.

FIG. 1A illustrates a type of composite stringer 10 commonly referred to as an "I-stringer," while FIG. 1B illustrates a type of composite stringer 10 commonly referred to as a "hat stringer." Typically, stringer 10 can be manufactured utilizing any of a variety of different technologies, and may be comprised of any materials known in the art. Such materials include, but are not limited to, epoxy, Kevlar, carbon fiber, and/or other materials as needed or desired. Regardless of its particular type, composition, profile, or shape, though, stringer 10 generally comprises one or more rigid, composite structural members 12, 14, and fixedly attaches to the structural framework 16 of an aircraft at a connection interface 18.

In the aspects illustrated in FIGS. 1A-1B, an optional base charge 22 is disposed between the structural members 12, 14 of stringer 10 and the structural framework 16. A base charge is a "padded" region that helps to increase damage tolerance, fabrication, and stiffness. Typically, the material comprising base charge 22 is the same material that comprises the components to which the structural framework 16 is attached (e.g., the "skin" of an aircraft). However, according to the present disclosure, a base charge 22 is not required. In some aspects, such as the one seen in FIG. 2, a base charge 22 is not present.

There are a various types of connection interfaces 18 illustrated in FIGS. 1A-1B. Each connection interface 18 fills a void or groove created by the geometry of the structural members 12, 14 of stringer 10 when attached to the structural framework 16 of the aircraft. One type of connection interface 18 is a noodle 20 and comprises a filler material that is inserted into the void. Another type of connection interface comprises a so-called "tape" interface disposed between stringer 10 and structural framework 16. Of course, other types of connection interfaces 18 may exist; however, regardless of the particular type, connection interface 18 strengthens and stiffens the structural framework 16 of the aircraft.

As stated above, connection interfaces 18 experience various stresses and loadings both during and after manufacture. Such stresses and loads include, for example, the thermal stresses experienced during the curing process, as well as the stresses and mechanical loadings experienced after the curing process and/or while the aircraft is in use. Stresses and loadings of this type are commonplace, but are one possible cause of progressive cracking and failure of the noodle 20 at the connection interface 18. And, once the noodle 20 has cracked, the structural framework 16 for the aircraft is weakened.

Figure 2:
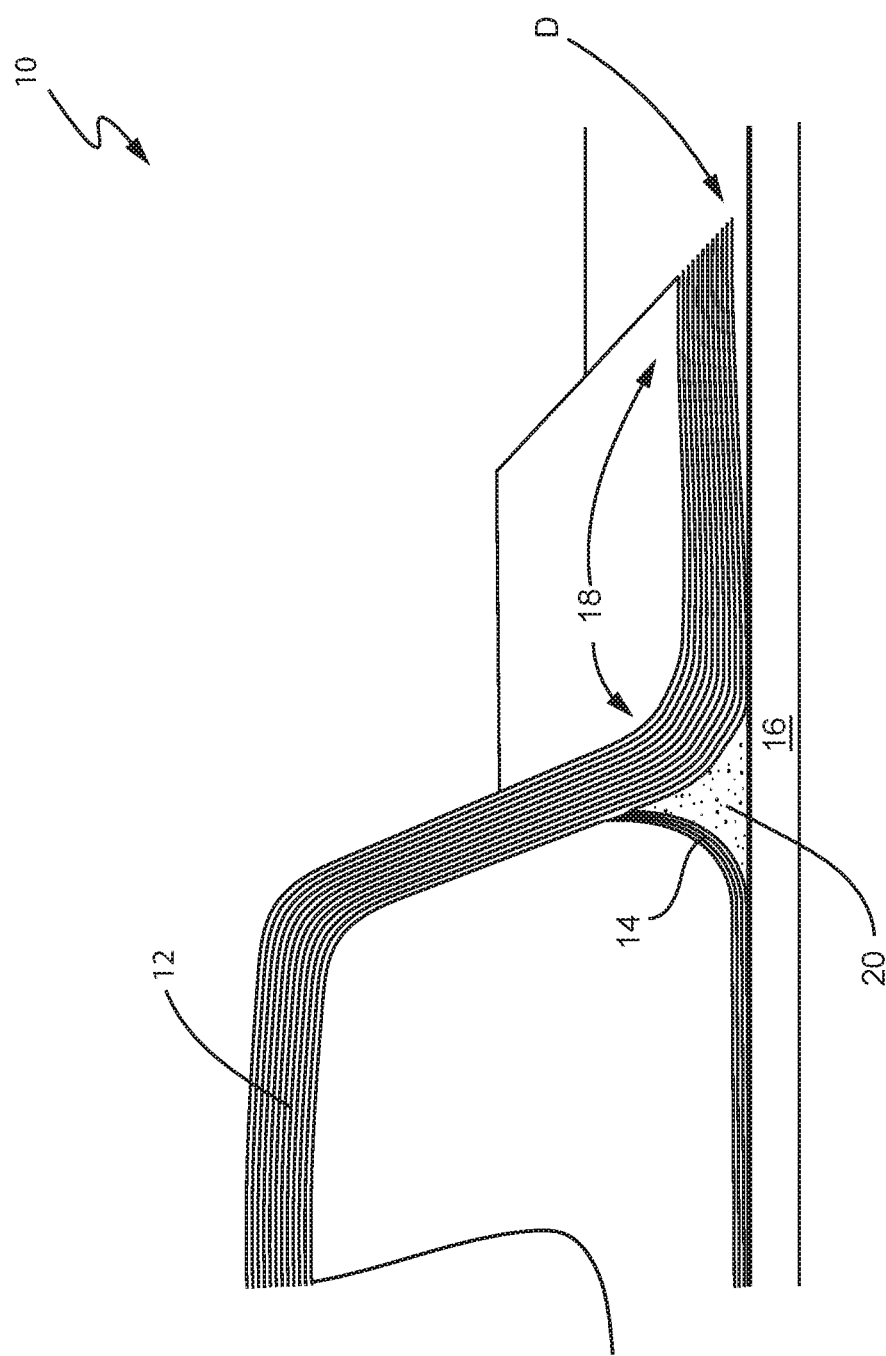
FIG. 2 illustrates a cross-sectional view of a stringer attached to a structural framework of a vehicle with a delamination separation between the stringer and the structural framework.
Figure 3A:
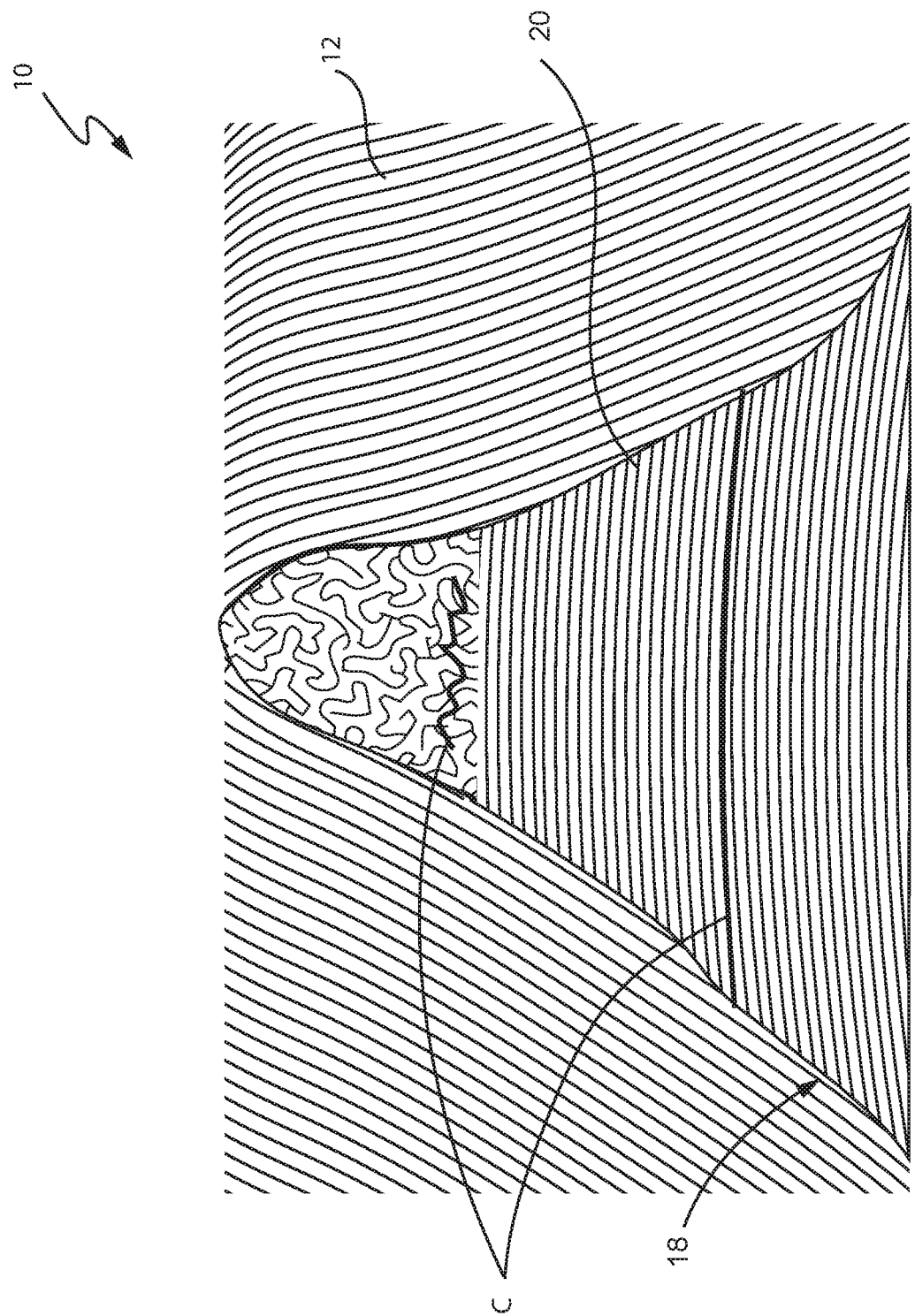
FIG. 3A is a magnified view illustrating a cross-section of a composite filler material (e.g., a "noodle") inserted into a void area between a composite stringer and the structural framework of a vehicle according to one aspect of the present disclosure.
Figure 3B:
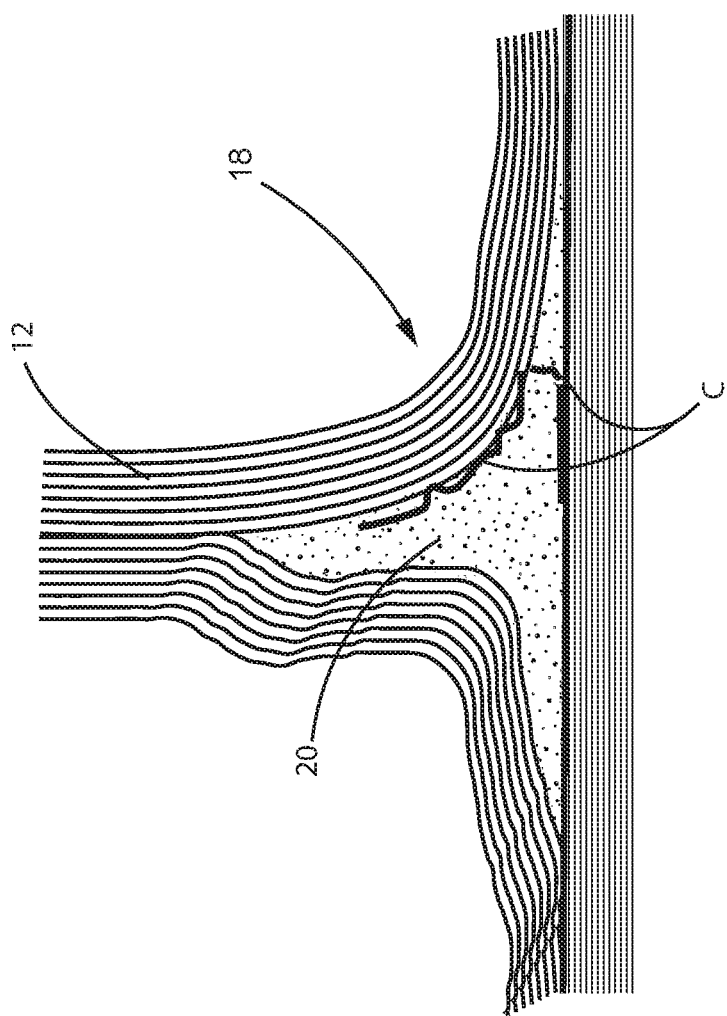
FIG. 3B is a magnified view illustrating a cross-section of an adhesive filler material (e.g., a "noodle") inserted into a void area between a composite stringer having non-symmetric geometry and the structural framework of a vehicle according to one aspect of the present disclosure.

FIG. 2 illustrates one type of crack known as a delamination D. With these types of cracks, structural member 12 separated from the underlying structural framework 16 of the aircraft. FIGS. 3A-3B illustrate other types of cracks C that can appear in noodle 20. With these types of cracks, the structure of the noodle 20 is compromised, thereby leading to a weakened structural framework 16 for aircraft. As seen in FIGS. 3A and 3B, a given crack C can appear anywhere in a noodle 20, and further, can extend the entire width or length of the noodle 20, or extend simply within the length of noodle 20. In many cases, cracks C in a noodle 20 typically occur due to the manufacturing process, and tend to complicate the analysis/understanding of a "starting" stress state (i.e., the initial stress state of the noodle 20). Further, cracks C can appear regardless of whether the noodle 20 comprises a composite material (e.g., as seen in FIG. 3A), or an adhesive material (as seen in FIG. 3B). Cracks C that do not extend all the way across a noodle 20 are generally referred to as "hidden cracks" or "embedded cracks." Conventional methods of predicting cracking in a noodle are not able to predict such hidden cracks. However, a computing device configured according to the present aspects is able to detect such embedded cracks. Thus, a computing device configured according to the present aspects is able to understand the starting stress state of the noodle 20 better than conventional methods, and as such, is configured to provide a more accurate analysis than its conventional counterparts.

Figure 4:
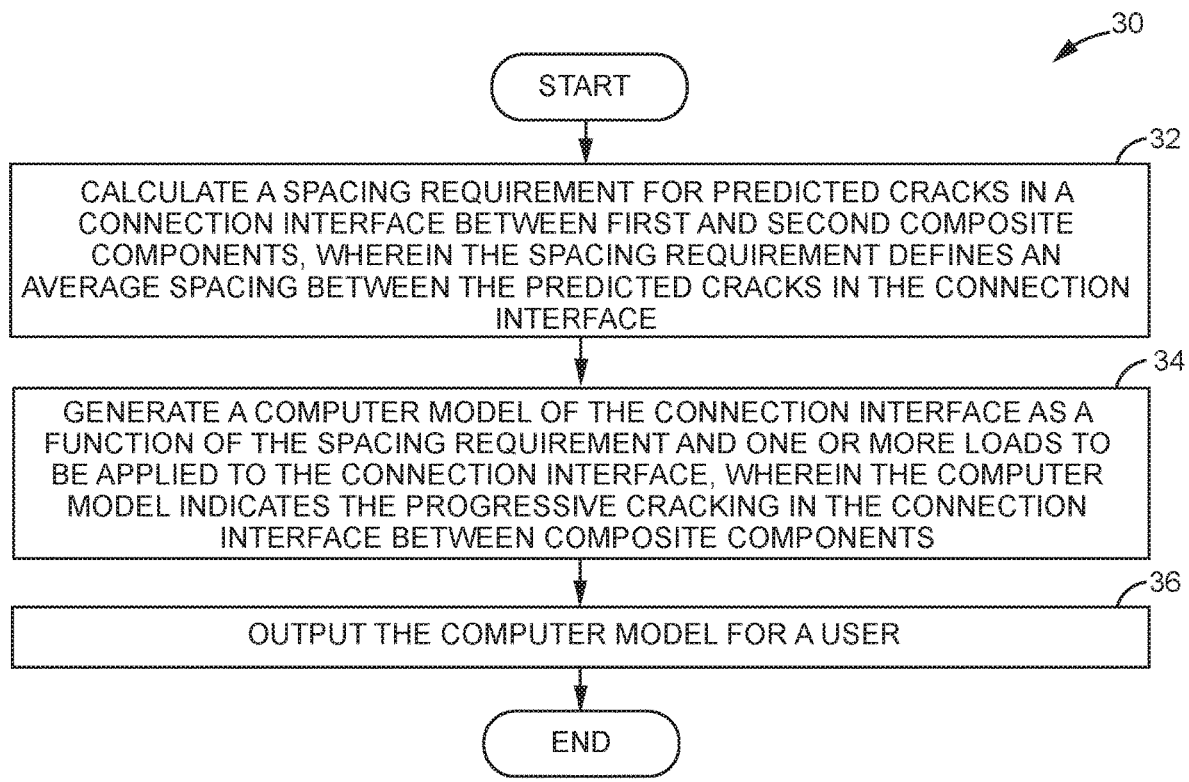
FIG. 4 is a flow diagram illustrating a method for modeling progressive cracking in a composite filler material disposed in a void area between a composite stringer and a structural framework of a vehicle according to one aspect of the present disclosure.

FIG. 4 is a flow chart illustrating a method 30 for generating a computer model of a connection interface 18 according to one aspect of the present disclosure. The generated computer model predicts the progressive creation, density, and spacing, of multiple cracks C in a filler material such as noodle 20 at the connection interface 18 due to the initial and residual stresses previously described.

As seen in FIG. 4, method 30 begins with calculating a spacing requirement for the predicted cracks in a connection interface between first and second composite components (box 32). In this aspect, the spacing requirement defines an average spacing (e.g., 5 mm) between the predicted cracks that could appear in noodle 20 as a result of the initial and residual stresses being exerted on the noodle 20. The formulae used to calculate the spacing requirement according to one aspect of the disclosure are described in more detail below. Generally, however, the crack spacing requirement is computed as part of a crack density requirement (also discussed in more detail below). According to aspects of the present disclosure, the computations are performed iteratively producing a generated set of benchmark calibration curves and providing, inter alia, a value for the crack spacing requirement.

Once the spacing requirements have been determined, method 30 calls for generating a computer model of the noodle 20 as a function of the spacing requirement and one or more loads to be applied to the connection interface (box 34). In this particular aspect, the computer model is generated to comprise information indicating the progressive cracking in noodle 20. Method 30 then calls for outputting the computer model for a user (box 36). By way of example, outputting the computer model to a user in one aspect of the disclosure comprises generating a visual representation of the noodle 20 illustrating the predicted cracks, and sending the visual representation to a display device thereby allowing the user to actually view the possible spacing and density of the cracks that are predicted to occur in the noodle 20 before they actually do occur. In another aspect, the generated computer model is utilized as input into an FEM analysis of the connection interface. Regardless of the particular output, though, a computer model generated according to the present aspects provides users with a more accurate account of the progressive cracking that can occur in a noodle 20 as a result of the initial and residual stresses and loads exerted on the noodle 20. Such accuracy, as stated above, allows designers and manufacturers to create better stringers, spars, and filler materials in a more cost effective manner.

Figure 5:
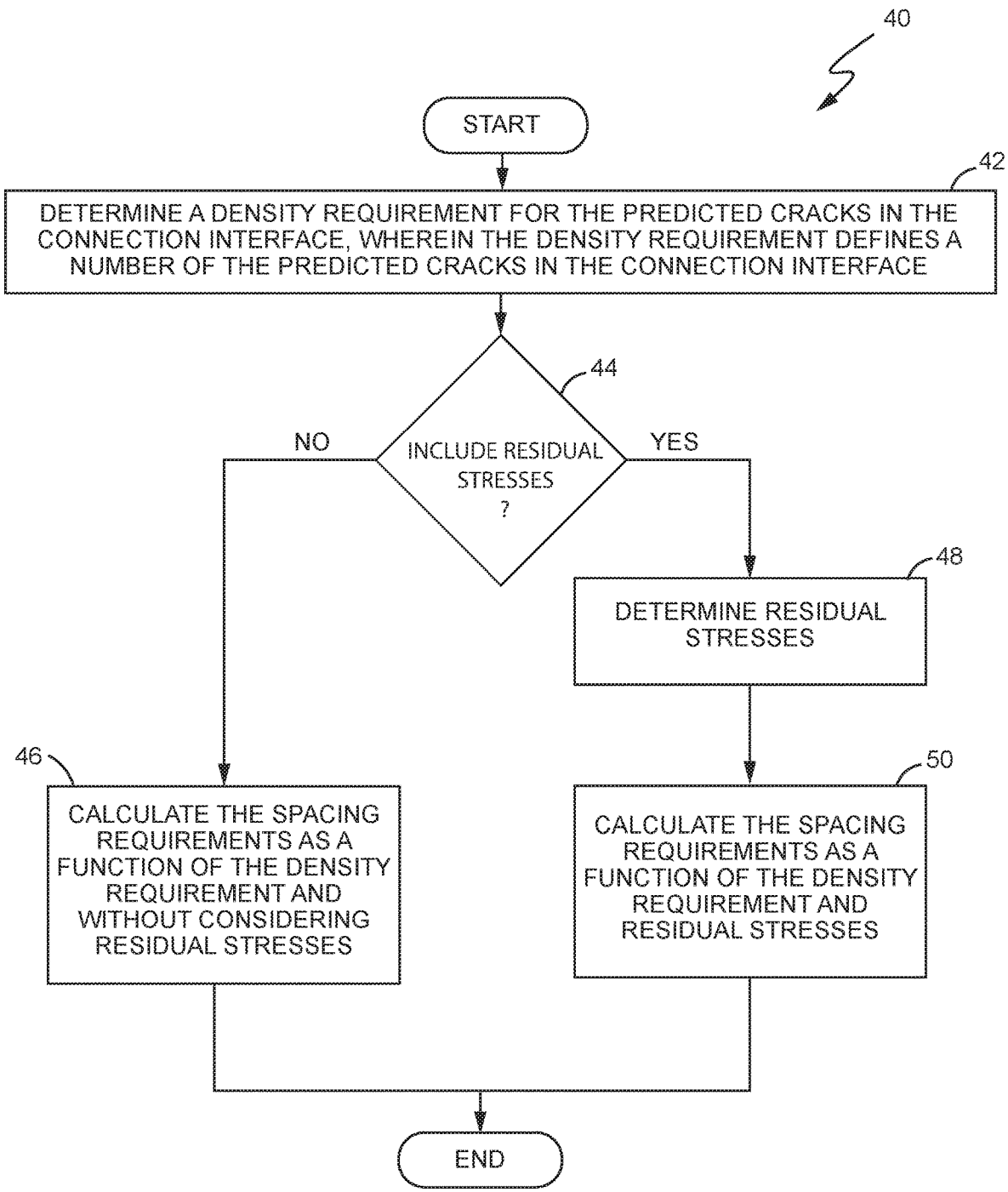
FIG. 5 is a flow diagram illustrating a method for calculating a spacing requirement for predicted cracks in a composite filler material according to one aspect of the present disclosure.

Those of ordinary skill in the art should readily appreciate that there are different ways by which to determine the spacing requirements. Method 40 of FIG. 5 illustrates one such method. In particular, method 40 first calls for determining a "density requirement" for the predicted cracks in the connection interface (box 42). In the context of this disclosure, the density requirement defines a number of predicted cracks in the noodle 20 (or other filler material at the connection interface 18) per unit area (e.g., 10 cracks per 5 mm). Method 40 next determines whether to include the previously described residual stresses in the calculations when computing the spacing requirement (box 44). In some aspects, the information on which this decision is based is provided by a user. For example, a user may indicate, via a user interface, whether or not to include the residual stresses in the calculations and/or the particular type of residual stresses to include in the calculations. If method 40 determines that no residual stresses are to be included in the spacing requirement calculations, then the spacing requirement is calculated as a function of the density requirement without considering the effects of the residual stresses (box 46). However, if residual stresses are to be included, method 40 determines values for the residual stresses (box 48) (e.g., by measuring the stresses or using extrinsic historical data), and computes the spacing requirement as a function of both the density requirement and the residual stresses (box 50).

Similarly, there are different ways in which to determine the density requirement when calculating the spacing requirements. For example, one aspect of the present disclosure calculates the crack density requirement utilizing the following closed form solutions for a simple crossply laminate representing, for example, the material for noodle 20, comprising 0° and 90° plies [0/90]s. Other perturbations of the crossply laminate to represent a behavior of noodle 20 at a simplified level may include, but is not limited to, embedded adhesive, embedded off-axis layers, and embedded filler material of any form. For a current crossply configuration, the axial stress distribution $\sigma_{1x}$ in the 0° plies is calculated using:

$$\sigma_{1x} = \frac{E_1}{E_x}\left[\frac{E_2 h_2 \cosh\alpha\left(\frac{l}{2}-x\right)}{E_2 h_2 \cosh\left(\frac{\alpha l}{2}\right)}\right]\overline{\sigma}_x + \left[1 - \frac{\cosh\alpha\left(\frac{l}{2}-x\right)}{\cosh\left(\frac{\alpha l}{2}\right)}\right]\sigma_{1r} \quad (1)$$

and the axial stress distribution $\sigma_{2x}$ in the 90° plies is calculated using:

$$\sigma_{2x} = \left[1 - \frac{\cosh\alpha\left(\frac{l}{2}-x\right)}{\cosh\left(\frac{\alpha l}{2}\right)}\right]\left[\frac{E_2 \overline{\sigma}_x}{\overline{E}_x} + \sigma_{2r}\right] \quad (2)$$

A shear-lag relationship $\alpha^2$ between the contacting plies is typically estimated as a function of the associated shear moduli and layer thickness as follows:

$$\alpha^2 = \frac{2(h_1 + h_2)\overline{E}_x}{h_1 h_2 E_1 E_2} \frac{G_{12} G_{23}}{h_1 G_{23} + h_2 G_{12}} \quad (3)$$

where:
$E_1$, $E_2$ are longitudinal and transverse moduli;

$$\overline{E}_x = \frac{h_1 E_1 + h_2 E_2}{h_1 + h_2} = \text{laminate modulus before damage;}$$

$\sigma_{1x}$, $\sigma_{2x}$, $\overline{\sigma}_x$=axial stresses in 0° and 90° layers, and laminate, respectively;
l=crack spacing,
$h_1$, $h_2$=thicknesses of 0° and 90° layers
$G_{12} G_{23}$=in-plane/intralaminar shear moduli; and
$\alpha^2$=shear-lag relationship.

In more detail, this aspect of the present disclosure operates on an assumption that the crack spacing will be substantially uniform. Based on this assumption and using the following formulae, aspects of the present disclosure compute the average crack density as a mean of the crack densities for values of $\sigma_{2x}$ that are slightly greater than, and less than, $F_{2t}$.

$$\lambda_m = \frac{3\alpha}{4\cosh^{-1}\zeta} \quad (4)$$

wherein lambda $\lambda_m$ is the crack density, and wherein zeta $\zeta$ is computed as follows:

$$\zeta = \frac{\frac{E_2 \overline{\sigma}_x}{\overline{E}_x} + \sigma_{2r}}{\frac{(E_2 \overline{\sigma}_x)}{\overline{E}_x} + \sigma_{2r} - F_{2t}} = \frac{\overline{\sigma}_{2x}}{\overline{\sigma}_{2x} - F_{2t}} \quad (5)$$

It should be noted that in this aspect, equation (5) considers the residual stress $\overline{\sigma}_r$ in the computations. However, those of ordinary skill in the art should appreciate that including residual stress $\overline{\sigma}_r$ is not required. In some aspects, the residual stress $\overline{\sigma}_r$ may not be included in the calculations depending on whether a user, for example, specifies that residual stress $\overline{\sigma}_r$ should be included.

The axial stress distribution $\sigma_{2x}$ is then determined for a segment of a noodle having at least two cracks using equation (2) above:

$$\sigma_{2x} = \left[1 - \frac{\cosh\alpha\left(\frac{l}{2}-x\right)}{\cosh\left(\frac{\alpha l}{2}\right)}\right]\left[\frac{E_2 \overline{\sigma}_x}{\overline{E}_x} + \sigma_{2r}\right] \quad (2)$$

Then, letting $$\sigma_{2x\left(x=\frac{l}{2}\right)} = F_{2t} \quad (6)$$

and assuming that the embedded 90° layer fails (i.e., cracks) responsive to reaching a critical or maximum strength limit, aspects of the present disclosure can solve for $F_{2t}$:

$$F_{2t} = \left[1 - \frac{1}{\cosh\left(\frac{\alpha l}{2}\right)}\right]\left[\frac{E_2 \bar{\sigma}_x}{E_x} + \sigma_{2r}\right] \quad (7)$$

Then:

$$\frac{\frac{E_2 \bar{\sigma}_x}{E_x} + \sigma_{2r}}{\frac{E_2 \bar{\sigma}_x}{E_x} + \sigma_{2r} - F_{2t}} = \cosh\left(\frac{\alpha l}{2}\right) \quad (8)$$

As stated above, the objective is to iteratively calculate crack spacing l as a function of specimen length and load. This creates a plurality of benchmark curves for crack density as a function of axial loading.

It should be noted that letting $$\sigma_{2x\left(x=\frac{l}{2}\right)} = F_{2t}$$

in accordance with the present disclosure allows for the calculation of a stochastic/distribution of ILS strengths based on a number of cracks.

Figure 6:
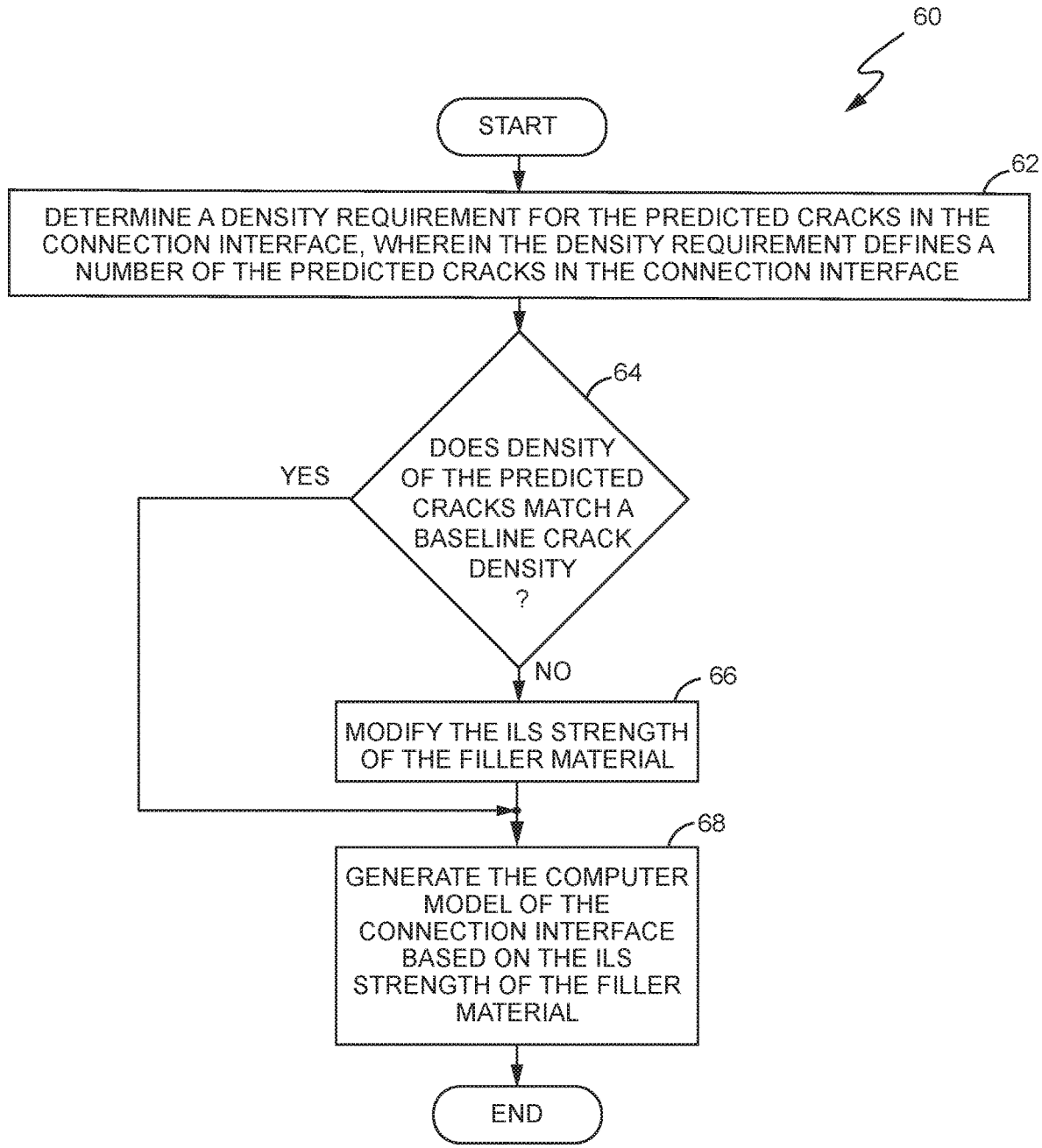
FIG. 6 is a flow diagram illustrating a method for generating a computer model of a connection interface comprising a composite filler material according to one aspect of the present disclosure.

FIG. 6 is a flow diagram illustrating a method 60 for generating a computer model of a connection interface according to one aspect of the present disclosure. Method 60 begins with determining the density requirement for the predicted cracks (e.g., 10 cracks per 5 mm) in the connection interface (box 62). As defined previously, the density requirement according to the present disclosure defines the number of predicted cracks in the noodle 20 per unit area. Method 60 then compares this determined crack density to a baseline crack density (box 64).

Those of ordinary skill in the art will readily appreciate that there are various ways in which to obtain a baseline crack density. However, in one aspect of the present disclosure, the baseline crack density comprises one or more data values obtained using computed tomography (CT) scanning. Particularly, in these aspects, a physical specimen of a connection interface is loaded into a scanning device (e.g., a Computer Axial Tomography (CAT) machine) and scanned. The physical specimen can be, for example, an actual connection interface 18 having a noodle 20 that has been subject to the initial and residual stresses previously described, and therefore, provides "real world" data on actual cracking that has occurred in the noodle 20. The results of the CT scan are then processed into images so that a user or image processing function, for example, is able to count the number of actual cracks in the noodle 20. This data is then stored in memory (e.g., a database) as one or more baseline crack density values associated with the particular type of connection interface that was scanned. Thereafter, method 60 can determine the type of connection interface 18 and/or noodle 20 of interest, and compare the calculated crack density value for the noodle 20 of that particular connection interface 18 to corresponding baseline crack density information stored in the memory.

If method 60 determines that the determined crack density for the predicted cracks matches the baseline crack density (box 64), either exactly or to within an acceptable threshold, method 60 utilizes the Interlaminar Shear (ILS) strength of the noodle 20 material under test to generate a computer model of the connection interface (box 68). The ILS, as is known in the art, is a value indicating the maximum shear stress that exists between the layers of a laminated composite material, such as noodle 20. The generated computer model can then be used to generate a visual representation of the connection interface and/or input into an FEM-based analysis to help manufacturers to design and build stronger, more robust connection interfaces.

However, if the determined crack density for the predicted cracks does not match the baseline crack density, at least to within a predefined threshold amount (box 64), method 60 modifies the current ILS strength of the noodle 20 material (box 66). The ILS modifications can be performed using any technique needed or desired, but in one aspect, the ILS strength is iteratively increased by 10% of its current value each time the computed crack density does not match the baseline crack density to within a predetermined threshold. Once the crack densities match (box 64), method 60 generates the computer model of the connection interface 18. In cases where a computer model has already been modeled and is being updated, or in cases where the computer model is being generated based on a modified ILS, method 60 generates (box 68) the computer model as a refined computer model.

Thus, aspects of the present disclosure configure a computing device to generate a computer model of a connection interface 18 including a filler material, such as noodle 20, to predict the number, spacing, and density of multiple cracks that might appear in noodle 20 after the connection interface has experienced one or more initial stresses and one or more residual stresses. As stated above, the predicted cracks cover both the initial crack that appears in a connection interface due to an initial stress, as well as one or more subsequent cracks that might progressively appear in the connection interface as a result of any residual stresses. This method of the present disclosure deviates from the abilities of conventional modeling tools, which do not model progressive cracking in a noodle of a particular connection interface, but rather, are only able to model the initial crack in the noodle. Therefore, aspects of the present disclosure allow manufacturers and designers of stringers, spars, and aircraft, for example, to more accurately model the effects of multiple stresses on a given connection interface prior to any actual testing of a physical specimen of the connection interface. Such improved accuracy saves money and time, and increases the efficiency with which connection interfaces can be designed, built, and analyzed to ensure they meet or exceed defined safety standards, for example.

Figure 7:
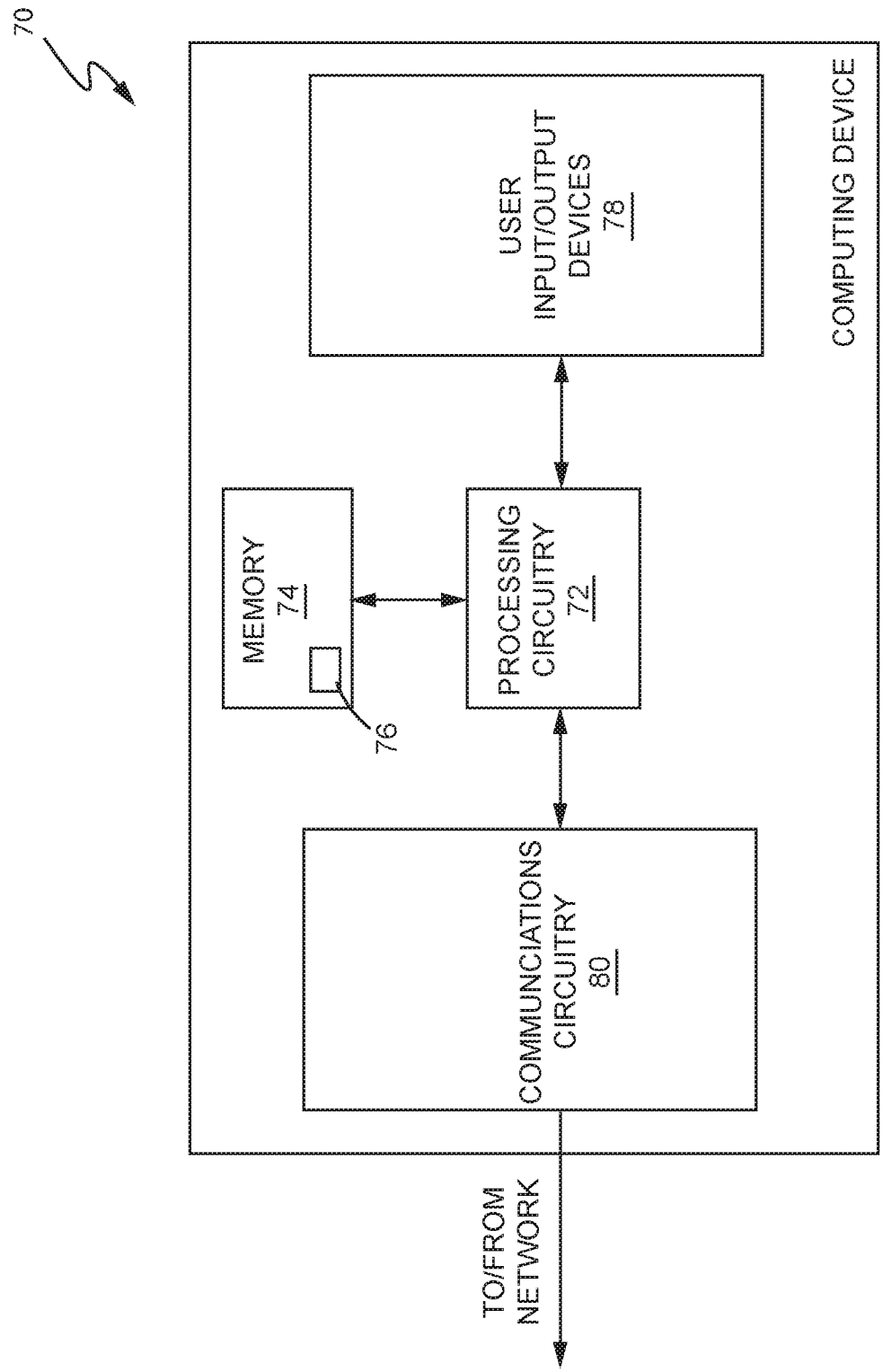
FIG. 7 is a schematic block diagram illustrating some components of a computing device configured to determine progressive cracking in a composite filler material according to one aspect of the present disclosure.

FIG. 7 is a schematic block diagram illustrating some components of a computing device 70 configured to generate the computer models as previously described. In particular, computing device 70 comprises processing circuitry 72 communicatively coupled to a memory 74 that stores one or more control programs 76, one or more user input/output devices 78 (e.g., a keyboard, a mouse, one or more display devices, etc.), and communication circuitry 80.

According to various aspects of the present disclosure, processing circuitry 72 comprises one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. In one such aspect, processing circuitry 72 includes programmable hardware capable of executing software instructions stored, e.g., as a machine-readable computer control program 76 in memory 74.

More particularly, processing circuitry 72 is configured to execute control program 76 to calculate the spacing requirement for the predicted cracks in a connection interface between first and second composite components, generate a computer model of the connection interface as a function of the spacing requirement and one or more loads to be applied to the connection interface, and output the generated model for the user, as previously described.

Memory 74 comprises any non-transitory machine-readable storage media known in the art or that may be developed, whether volatile or non-volatile, including (but not limited to) solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, individually or in any combination. As seen in FIG. 7, memory 74 comprises circuitry configured to store control program 76. In one or more aspects, however, memory 74 is also configured to store the baseline crack density values previously described.

The User Input/Output (I/O) devices 78 comprise any device known in the art that allow a user to interact with the computing device 70. Such devices can include, but are not limited to, microphones, display devices (such as a Liquid Crystal Display (LCD) and/or a Light Emitting Diode (LED) display for presenting visual information to a user), keyboards, a pointer device, such as a mouse, and the like. In accordance with the present disclosure, the computer models that are generated according to the present aspects are output by processing circuitry 72 to a display device. Thus, users are able to obtain a more accurate prediction of the number of cracks in a given connection interface, as well as visualize the connection interface with the predicted cracks at the determined crack density, thereby saving time and money, and increasing the efficiency by which connection interfaces can be designed, manufactured, and analyzed.

Communications circuitry 80 comprises circuitry configured to control the input and output (I/O) data paths of the computing device 70. The I/O data paths include data paths for exchanging signals with other computers and mass storage devices over a communications network (not shown). Such signals include, but are not limited to, those that are needed to obtain the baseline crack density values previously described from a storage location that is external to computing device 70. Such storage locations include, for example, databases. In some aspects, communications circuitry 80 comprises an ETHERNET card configured to communicate signals and data with one or more remote devices via one or more communications networks (not shown).

Figure 8:
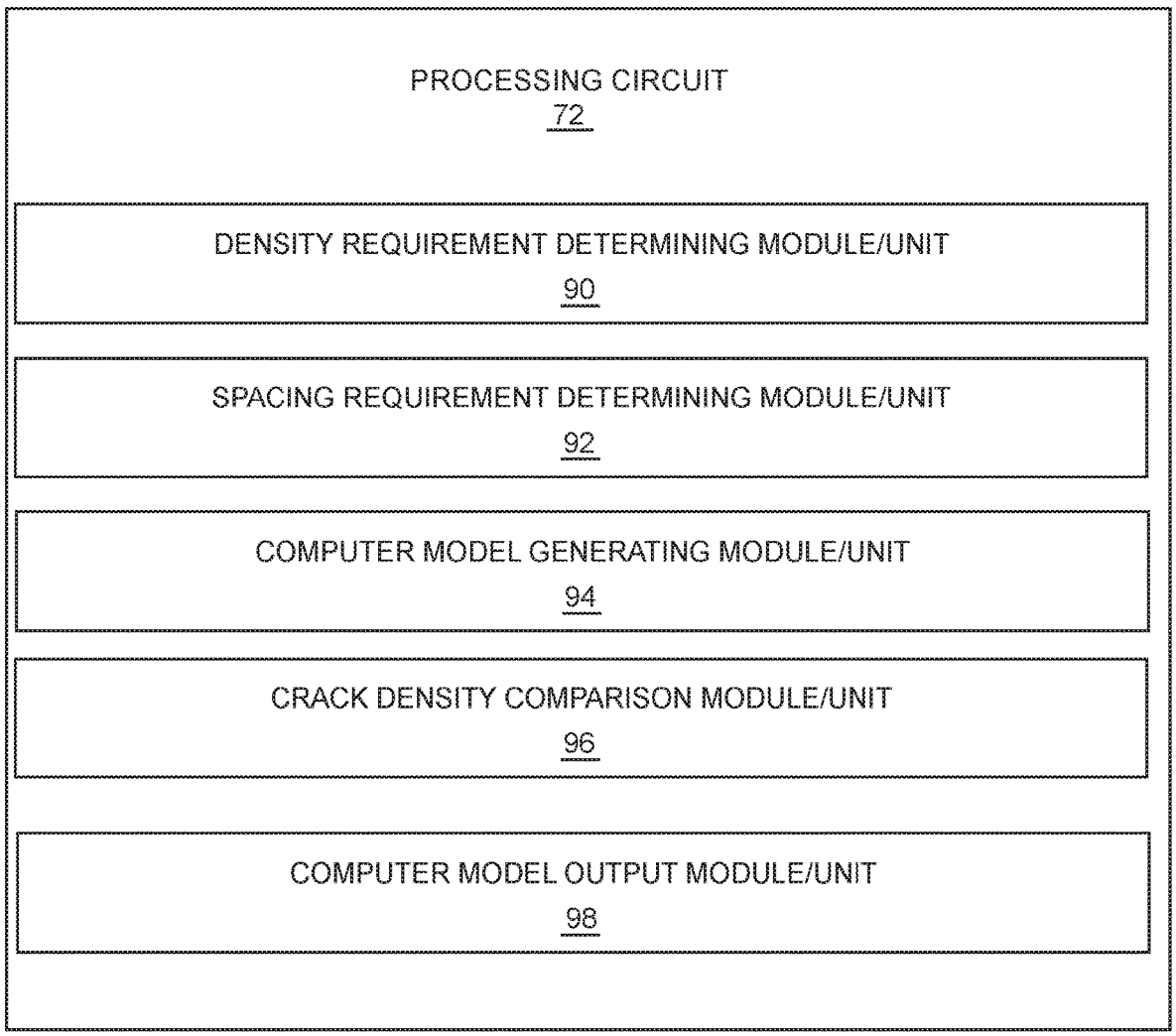
FIG. 8 is a block diagram illustrating example processing circuitry according to one or more aspects of the present disclosure.

FIG. 8 is a schematic block diagram illustrating processing circuitry 72 implemented according to different hardware units and software modules (e.g., as control program 76 store in memory 74) according to one aspect of the present disclosure. As seen in FIG. 8, processing circuitry 72 implements a density requirement determining unit/module 90, a spacing requirement determining unit/module 92, a computer model generating unit/module 94, and a crack density comparison unit/module 96.

The density requirement determining unit/module 90 is configured to calculate the crack density requirement. As previously described, this value defines the number of the predicted cracks in the connection interface. The spacing requirement determining unit/module 92 is configured to calculate a spacing requirement for the predicted cracks in the connection interface of interest based at least partially on the calculated crack density. That is, in some aspects, the spacing requirement determining unit/module 92 is configured to calculate the spacing requirement based on the crack density requirement without considering any residual stresses, while other aspects are configured to calculate the spacing requirements based on both the crack density requirement and one or more residual stresses, as previously described. The computer model generating unit/module 94 is configured to generate the computer model, while the crack density comparison unit/module 96 is configured to compare the determined crack density for the predicted cracks to the baseline crack density values, as previously described. The crack density comparison unit/module 96 is also configured, in at least one aspect, to increment the ILS strength value associated with a given filler material by a predetermined amount (e.g., 10%) each time the comparison indicates that the computed crack density does not match the baseline crack density value to at least within a predetermined threshold. The computer model output module/unit 98 is configured to output the computer model generated by the computer model generating unit/module 94. In one aspect, the computer model comprises values and information that the computer model output module/unit 98 uses to generate a visual representation of a connection interface. In these aspects, the computer model output module/unit 98 outputs the visual representation to a display device. In other aspects, however, the computer model output module/unit 98 outputs the values and information comprising the computer model as input into a FEM function so that a computer device can perform a finite element analysis according to the generated computer model.

Those of ordinary skill in the art should readily appreciate that the present disclosure is not limited solely to predicting progressive cracking in a connection interface, as described in the previous aspects. Rather, other aspects of the disclosure configure computing device 70 to utilize scanning data to determine progressive cracking in a connection interface between first and second composite structural components.

These aspects of the present disclosure provide benefits and advantages that classic approaches to determining cracks in a filler material (e.g., noodle 20) are not able to provide. For example, conventional methods for determining cracking in a connection interface require the loading of a crossply specimen into a test frame for scanning. The crossply specimen includes a connection interface (e.g., a filler material such as noodle 20). When scanning is complete, the crossply specimen is removed from the test frame so that any cracks in the crossply specimen can be viewed and counted.

Conventional approaches (e.g., microscopy, sectioning, imaging without load, etc.) are known to be inadequate. In particular, such approaches are utilized only for evaluating highly deformed damage states in connection interfaces because these approaches miss many of the closed cracks. Further, conventional approaches assume flat, straight (i.e., 2-Dimensional) crack front. Thus, conventional approaches are not configured to scan thick composites. This is especially undesirable because thick composites, which are applicable to spar structures in general, and to spar structures in the wings of an aircraft in particular, have a stress gradient that must be accounted for/replicated with the analysis to ensure an accurate ISS is determined.

Additionally, methods for determining cracks need to be able to identify all of the cracks in the plies. This requires, as stated above, an "in-situ" inspection of the connection interface under load performed by a scanning machine. However, because of low resolution, current in-situ techniques are inadequate.

For example, Differential Interference Contrast (DIC) microscopy is generally adequate for surface-only measurements. Acoustic Emission (AE) techniques are utilized particularly for acoustic emissions. However, because AE methods are non-visual, they are inadequate with which to inform a user about a type of damage that has occurred and its location. Ultrasonic Scanning, Radiography/X-ray, Thermography, and Shearography are all low-resolution techniques. Further, both Radiography/X-ray and Thermography provide only 2-Dimensional images, and Thermography techniques have a limited application to laminates. Notably, though, each of these techniques are inadequate because, due to their limited resolution, they miss "hidden" or embedded cracks due to a crack opening displacement being too low.

However, aspects of the present disclosure address these and other issues by utilizing the data and information resulting from an in-situ CT scan of a specimen of a connection interface. Such in-situ CT scans provide the ability to concurrently place the specimen under a varying load and visualize crack propagation more clearly than permitted by existing approaches. For example, in one aspect, the in-situ scans of the present disclosure scan a specimen at <15 μm resolution. Scanning at such a high resolution allows for multiple pixels to represent the width of an open crack in 3-Dimensions, thereby allowing for a full volumetric characterization of a damage state.

Additionally, by utilizing the in-situ scans, aspects of the present disclosure reduce the amount of data generated by the analysis. In some embodiments, which will be described later in more detail, the data resulting from the in-situ scans is utilized in the prediction of progressive cracking in a connection interface, as well as in the evaluation and analysis of such connection interfaces.

Figure 9:
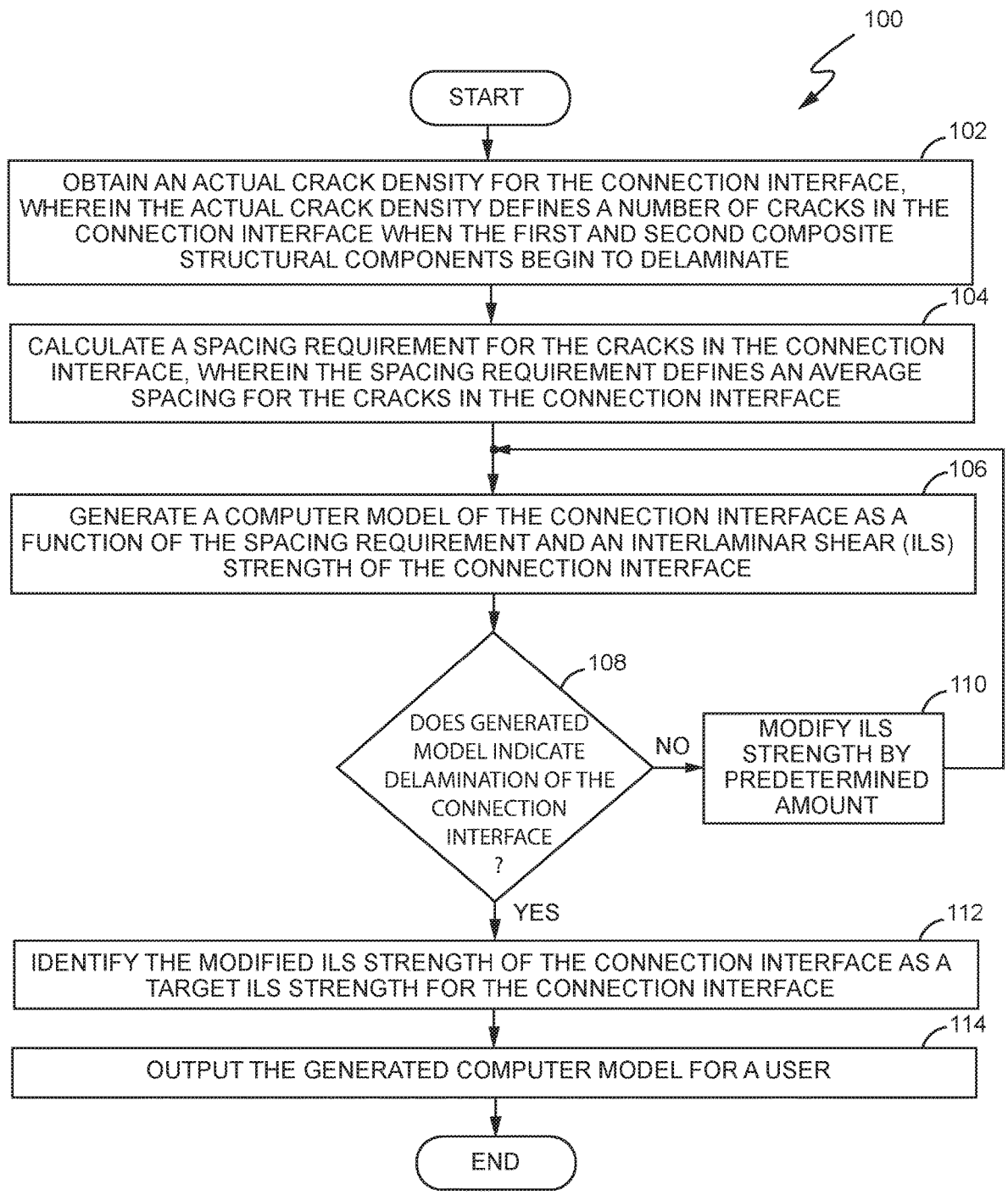
FIG. 9 is a flow diagram illustrating a method for determining progressive cracking in a connection interface between first and second composite structural components according to one or more aspects of the present disclosure.

FIG. 9 is a flow diagram illustrating a method 100 for determining progressive cracking in a connection interface between first and second composite structural components according to one or more aspects of the present disclosure. As seen in FIG. 9, method 100, which is implemented by computing device 70, begins with obtaining an actual crack density for the connection interface 18 (box 102). In the context of the present disclosure, the actual crack density defines a number of cracks in the connection interface 18 when the first and second structural members 12, 14 begin to delaminate. Further, the actual crack density can be obtained, for example, by retrieving data and information associated with a given specimen that was radiologically scanned using, for example, a CT scanner. Such data could comprise, for example, extrinsic data gathered and stored as the result of the CT scan.

Once the actual crack density has been computed, method 100 calls for calculating a spacing requirement for the cracks that appear in the connection interface (box 104). As stated previously, the spacing requirement defines the average spacing for the cracks in the connection interface and can be computed, for example, using the process previously described. Method 100 then iteratively generates a computer model of the connection interface as a function of the spacing requirement and an interlaminar shear (ILS) strength of the connection interface (box 106). Particularly, once the model has been generated, a check is then made to determine whether the computer model indicates a delamination of the connection interface (box 108). If not, the ILS strength of the filler material is incremented by a predetermined amount (box 110) and the computer model is regenerated according to the spacing requirement and the modified ILS (box 106).

The iterations continue until the computer model indicates a delamination event (box 108). Once this occurs, method 100 identifies the modified ILS strength as a target ILS strength for the filler material (box 112) and outputs the generated computer model for the user (box 114).

Figure 10:
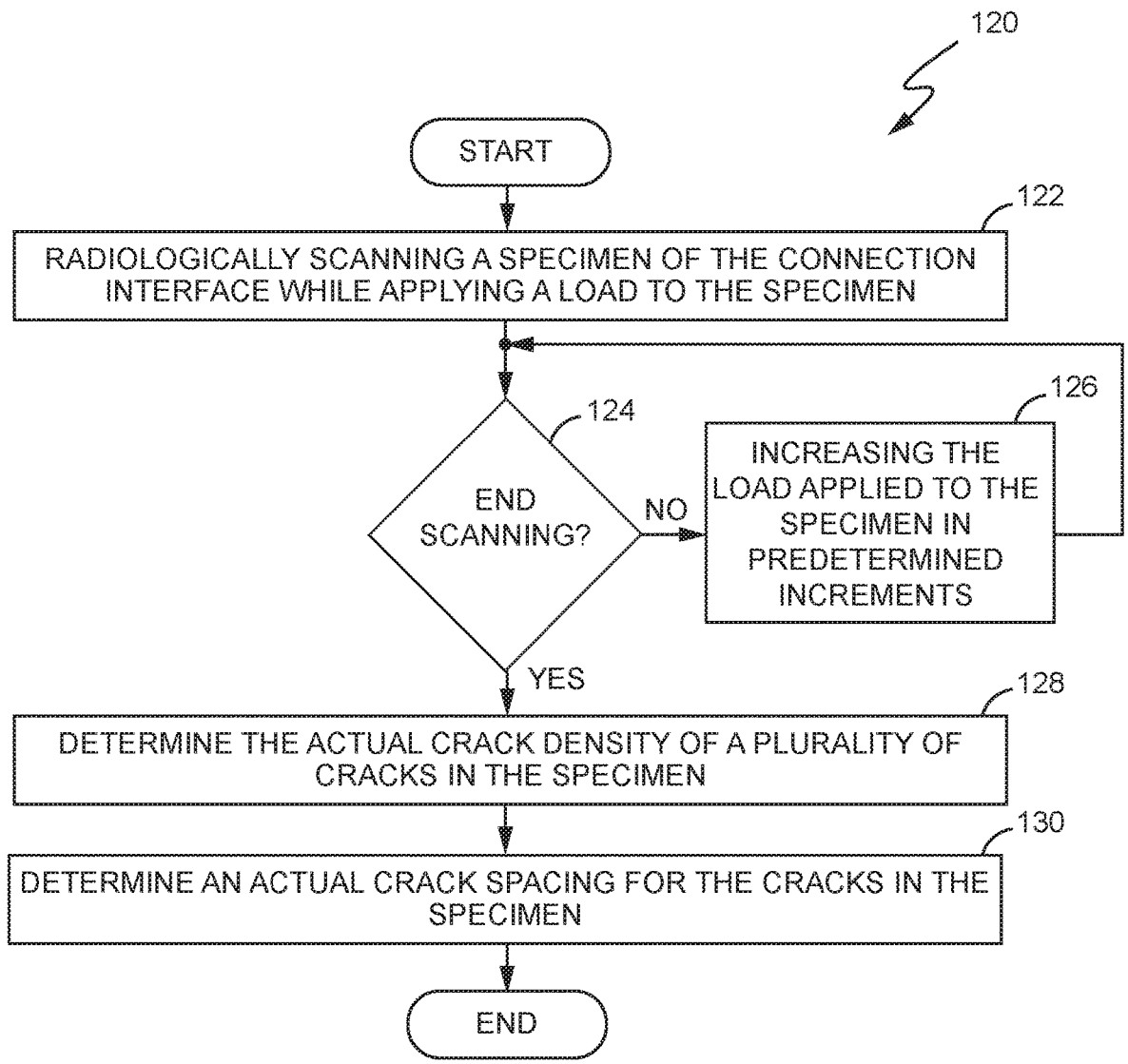
FIG. 10 is a flow diagram illustrating a method for obtaining crack density and crack spacing information for a specimen of a connection interface according to one aspect of the present disclosure.

FIG. 10 is a flow diagram illustrating a method 120 for obtaining crack density and crack spacing information for a specimen of a connection interface 18 according to one aspect of the present disclosure. Particularly, as seen in FIG. 10, a specimen of the connection interface 18 is put into a test frame of a CT scanning machine and radiologically scanned (box 122). In this aspect, the specimen is placed under a mechanical load that is increased in predetermined increments (box 126) while scanning continues until method 120 determines that scanning should end (box 124).

For example, in one aspect typically referred to as a "load-and-hold" approach, the specimen is placed into the CT scanning device and placed under load. The CT scanning is then performed during the "hold" cycle—i.e., CT scanning is a discontinuous process implemented only during the "hold" cycle of the load. Once the scan is complete, the load is incremented by a predefined amount (e.g., 10%), typically via application of crosshead displacement, to the next defined level. The iterations continue with the step-wise incrementing of the load at each iteration until the scanning process is complete.

Once scanning complete, the actual crack density of the cracks in the specimen (box 128), as well as the crack spacing (box 130), is determined. In one aspect, for example, a high resolution visual representation of the specimen is rendered to a user who, in turn, can count the number of cracks seen in the specimen and determine the spacing between the cracks. In other aspects, a computer can execute imaging software configured to analyze the CT scan results and automatically count the cracks in the specimen and determine spacing.

Those of ordinary skill in the art will readily appreciate that the CT scanning method described above is illustrative only, and that other scanning methods are also suitable according to various aspects of the present disclosure.

Figure 11:
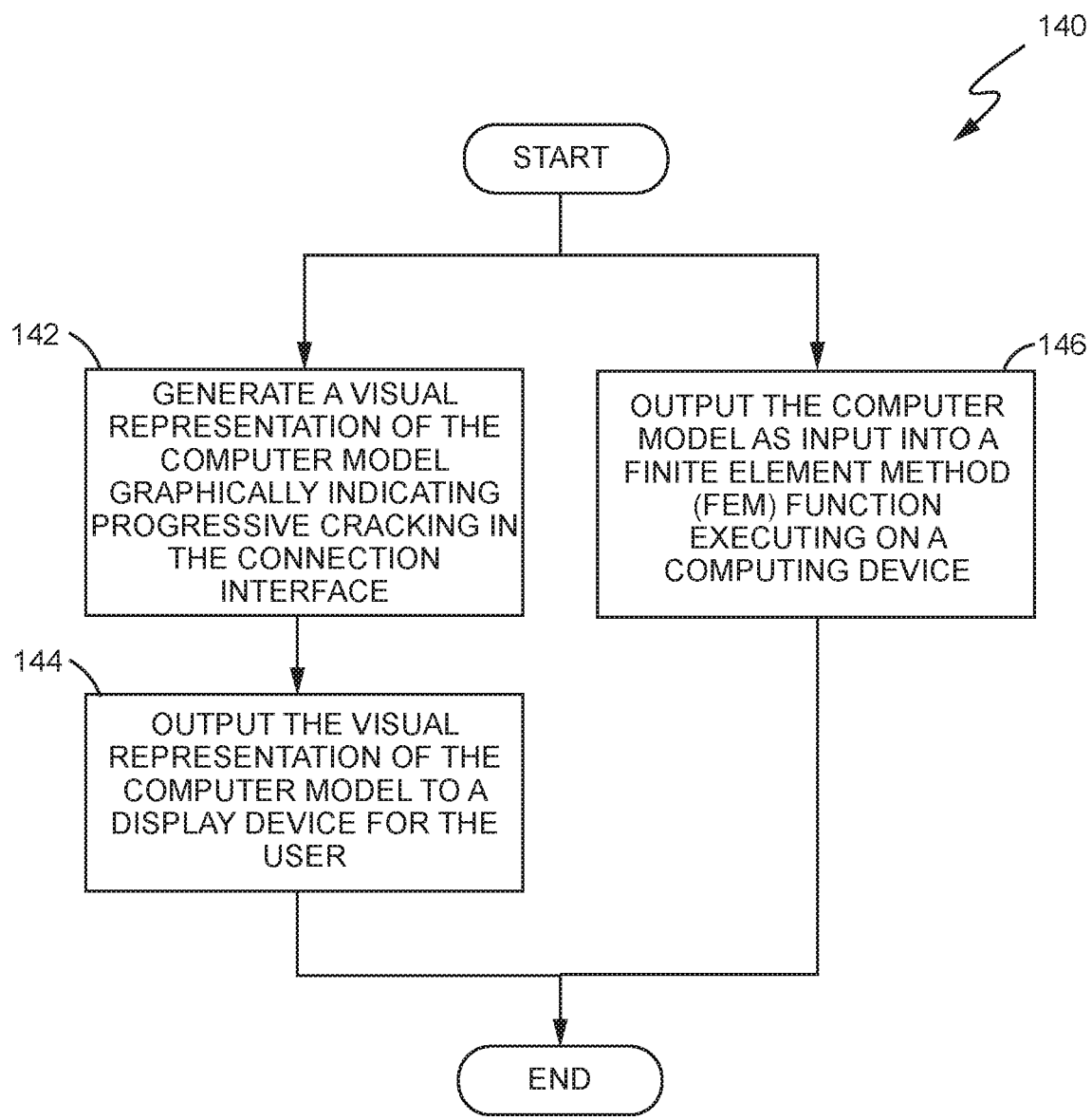
FIG. 11 is a flow diagram illustrating a method for outputting the data and information associated with a generated computer model according to one aspect of the present disclosure.

FIG. 11 is a flow diagram illustrating a method 140 for outputting the data and information associated with a generated computer model according to one aspect of the present disclosure. As previously stated, the computing device implementing method 100 (e.g., computing device 70) can output the computer model in any number of ways. In one aspect, for example, the computing device 70 generates a visual representation of the computer model based on the data and information associated with the computer model (box 142) before outputting the visual representation to a display device for the user (box 144). In another aspect, computing device 70 outputs the data and information associated with the generated computer model as one or more input parameters into an FEM function (box 146).

Figure 12:
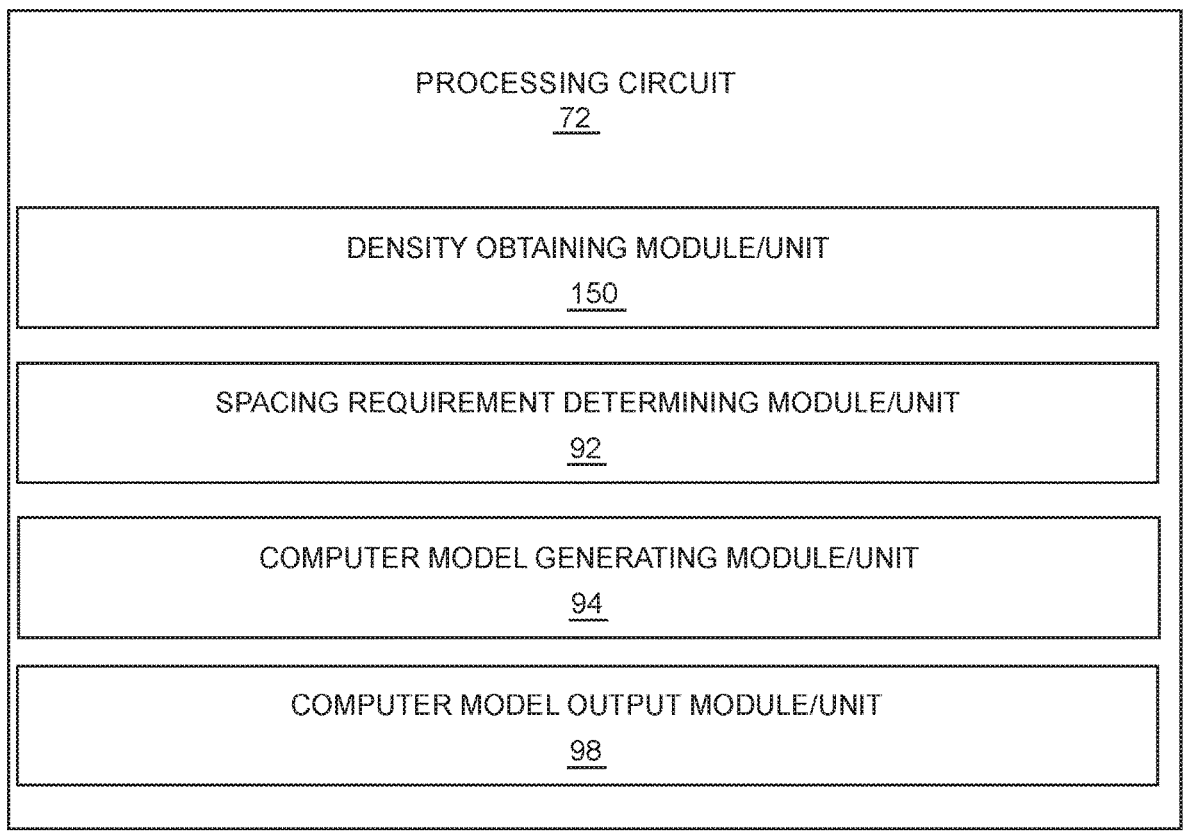
FIG. 12 is a block diagram illustrating example processing circuitry according to one or more aspects of the present disclosure.

FIG. 12 is a schematic block diagram illustrating processing circuitry 72 implemented according to different hardware units and software modules (e.g., as control program 76 stored in memory 74) according to one aspect of the present disclosure. As seen in FIG. 12, processing circuitry 72 implements a density obtaining unit/module 150, the spacing requirement determining unit/module 92 previously described, the computer model generating unit/module 94, and the computer model output module/unit 98.

The density obtaining unit/module 150 is configured to obtain an actual crack density of a specimen of a connection interface 18. As previously stated, such data can be retrieved from a CT scanning device that scanned the specimen, for example, or alternatively from a database of stored values associated with previously scanned specimens. The spacing requirement determining unit/module 92 is configured to calculate a spacing requirement for the cracks in the connection interface of interest based at least partially on the actual crack density. As above, the spacing requirement determining unit/module 92 is configured to calculate the spacing requirement in some aspects based on the crack density requirement without considering any residual stresses. In other aspects, the spacing requirement determining unit/module 92 is configured to calculate the spacing requirements based on both the crack density requirement and one or more residual stresses. The computer model generating unit/module 94 is configured to generate the computer model, while the computer model output module/unit 98 is configured to output the computer model generated by the computer model generating unit/module 94. In one aspect, the computer model comprises values and information that the computer model output module/unit 98 uses to generate a visual representation of a connection interface. In these aspects, the computer model output module/unit 98 outputs the visual representation to a display device. In other aspects, however, the computer model output module/unit 98 outputs the values and information comprising the computer model as input into a FEM function so that a computer device can perform a finite element analysis according to the generated computer model.

In other aspects, the present disclosure configures a computing device 70 to utilize scanning data to determine progressive cracking in a connection interface between first and second composite structural components. In these aspects, a computing device 70 is configured to more accurately locate the "embedded" or "hidden" cracks in the filler material of a connection interface, such as noodle 20, thereby producing a computer model of the connection interface indicating a more accurate picture of the number and types of cracks in the filler material of the connection interface.

Figure 13A:
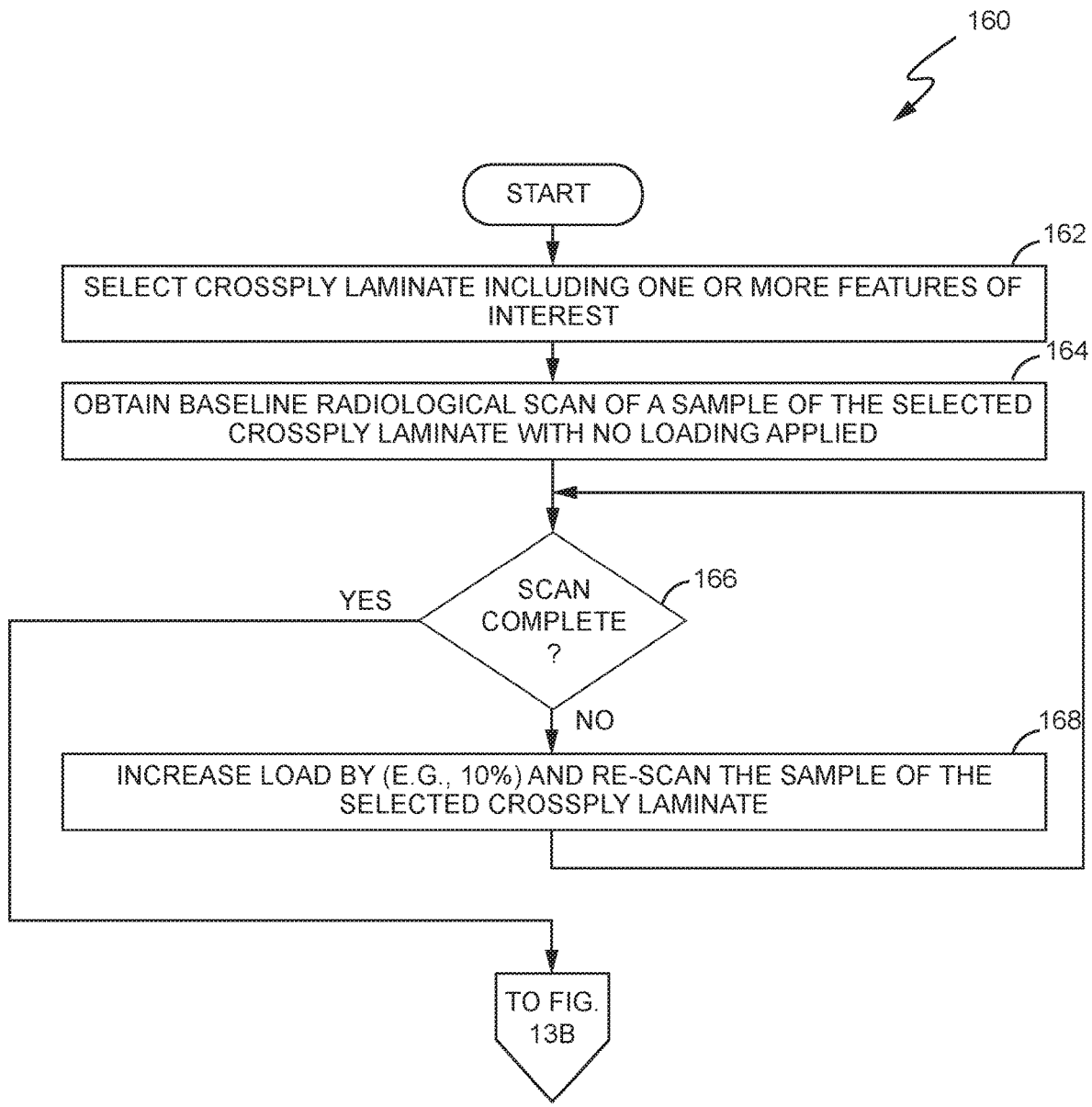
FIGS. 13A-13B are flow diagrams illustrating a method for determining progressive cracking, and in some aspects, an actual distribution of those cracks, in a crossply laminate according to one or more aspects of the present disclosure.
Figure 13B:
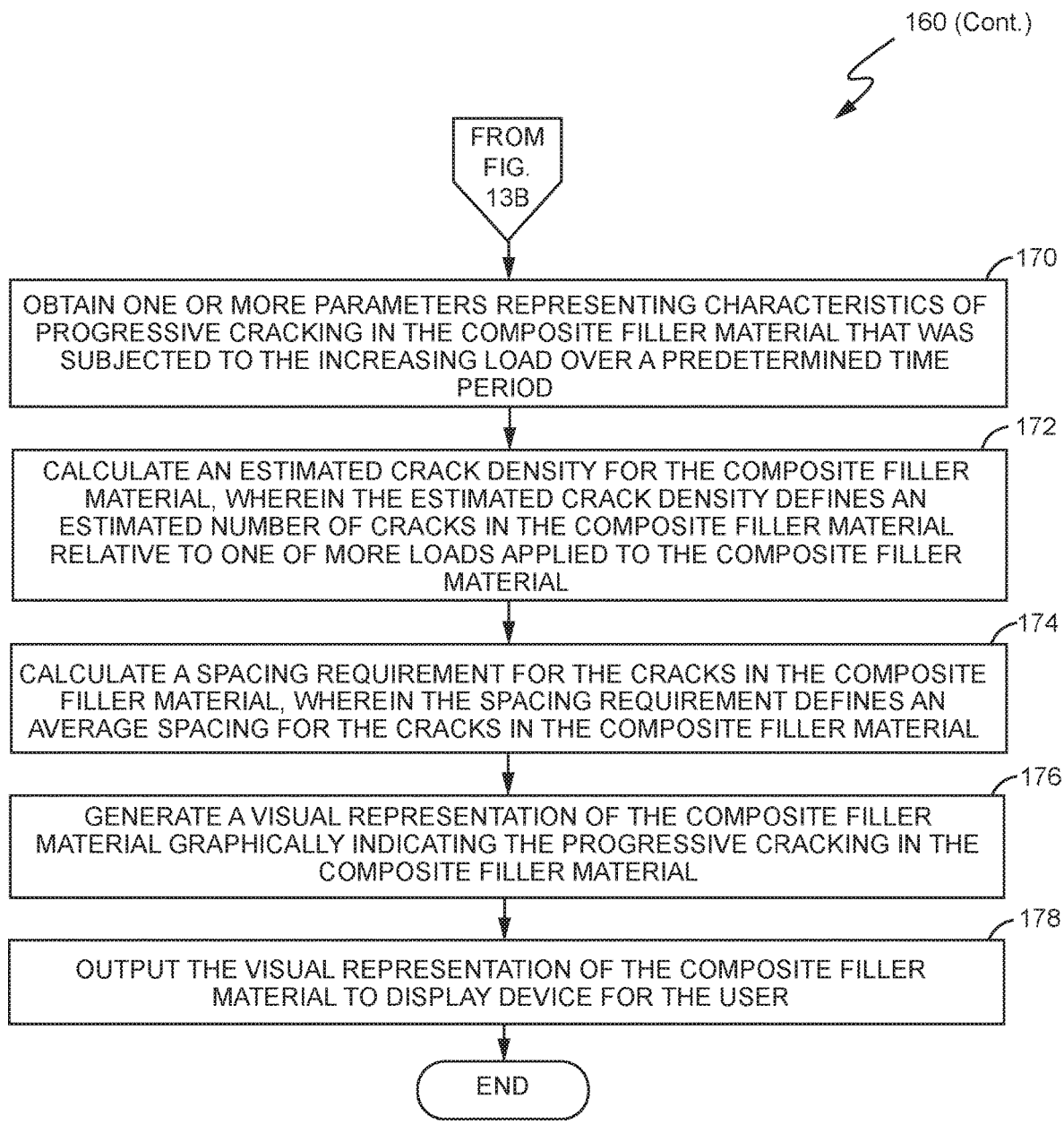

FIGS. 13A-13B illustrate a method 160 for determining progressive cracking, and in some aspects, an actual distribution of the cracks, in a crossply laminate according to one or more aspects of the present disclosure. It should be noted that while the present aspects are described in the context of a crossply laminate having external 0° layers and embedded 90° layers, it is for illustrative purposes only. Those of ordinary skill in the art should readily appreciate that the present aspects are also well-suited for use in determining progressive cracking in laminates that have no embedded 90° layers and/or in situations where adhesives, off-axis plies, or other materials are disclosed between the external and embedded layers.

As seen in FIG. 13A, method 160 begins with selecting a crossply laminate having the particular features of interest (box 162). The selection may be accomplished manually by a user, for example, or by a computer based on one or more features of interest provided by the user. Once selected, method 160 obtains a baseline radiological scan of a sample of the selected crossply laminate (box 164). In the context of this aspect, a baseline scan is a radiological scan of the selected sample with no loading applied. The scan may be performed using any scanning technology known in the art, but in this aspect, the sample is placed into a CT machine and scanned. More particularly, the CT machine is capable of scanning the sample at a resolution of less than 20 micrometer size voxels. This resolution permits the internal structure of the sample to be imaged at a resolution permitting accurate capture of the internal damage state.

Once the baseline scan is obtained, method 160 determines whether the scan of the sample is complete (box 166). If not, the load that is applied to the selected sample is increased by a predetermined amount (e.g., 10%), and the sample is re-scanned at that increased load and while the load is being applied (box 168). The scanning procedure continues in a loop, with the load being increased at each iteration by the predetermined amount and the sample being re-scanned (box 168), until scanning is complete (box 166). Scanning may be considered complete after a maximum load to be applied to the selected sample has been reached, for example, or after a predetermined time has elapsed, or once the selected sample has failed under load. Regardless of when scanning is complete, however, one or more parameters representing the characteristics of the selected sample are obtained and stored in a memory.

In one aspect, for example, the selected sample is removed from the CT machine and analyzed to obtain different parameters. The analysis may be a visual analysis performed by a user, for example, with or without the aid of a device that magnifies the selected sample, or by a computer device configured to perform the analysis based on a generated computer model of the selected sample. However, regardless of the manner in which the analysis is performed, examples of the parameters collected from the analysis represent characteristics of progressive cracking and can include, but are not limited to, a count of the total number of cracks, a count of the total number of "embedded" or "hidden" cracks, a length of one or more of the cracks, a width of one or more of the cracks, an average length and/or width of the cracks, and the like. As described below in FIG. 13B, one or more of these parameters can be utilized to calculate progressive cracking in a connection interface, including the hidden or embedded cracks, as well as determining the transverse tensile strength of the embedded layers in a crossply laminate.

Method 160 continues in FIG. 13B with obtaining one or more of the parameters representing the characteristics of progressive cracking in the composite filler material comprising the selected sample (box 170). Then, based on these parameters, method 160 calculates an estimated crack density for the composite filler material (box 172). The calculations may be performed using, for example, the equations previously described, and produce a value that defines the estimated number of cracks in the composite filler material relative to the load(s) applied to the selected sample. Method 160 then utilizes the previously described equations to calculate a spacing requirement for the cracks in the composite filler material (box 174), generates a visual representation graphically indicating the progressive cracking in the composite filler material (box 176), and outputs that generated visual representation to a display device for the user (box 178).

For example, as seen later in FIGS. 16A-16C, the generated graphical representation may comprise one or more 2-dimensional and/or 3-dimensional views of a composite filler material, and are generated based, at least in part, on the values computed from the previously described equations. By generating such visual representations according to the present aspects, computing device 70 is able to provide a more accurate visual picture of the extent of the progressive cracking that can be expected in a composite filler material under initial and/or subsequent loading. This includes a more accurate picture of the total number of cracks that can be expected, including the hidden cracks, their spacing, distribution, and in some cases, placement of the cracks in the composite filler material. Such knowledge allows a manufacturer, for example, to design and build a connection interface that is stronger and more stable without negatively affecting the functional performance of the stringer 10 or the vehicle it is used on. In some aspects, a computing device 70 configured according to the present embodiments can also assist in determining why a particular part of a vehicle failed. In both cases, the result allows manufacturers to build vehicles having an increased safety margin while cutting costs.

Figure 14:
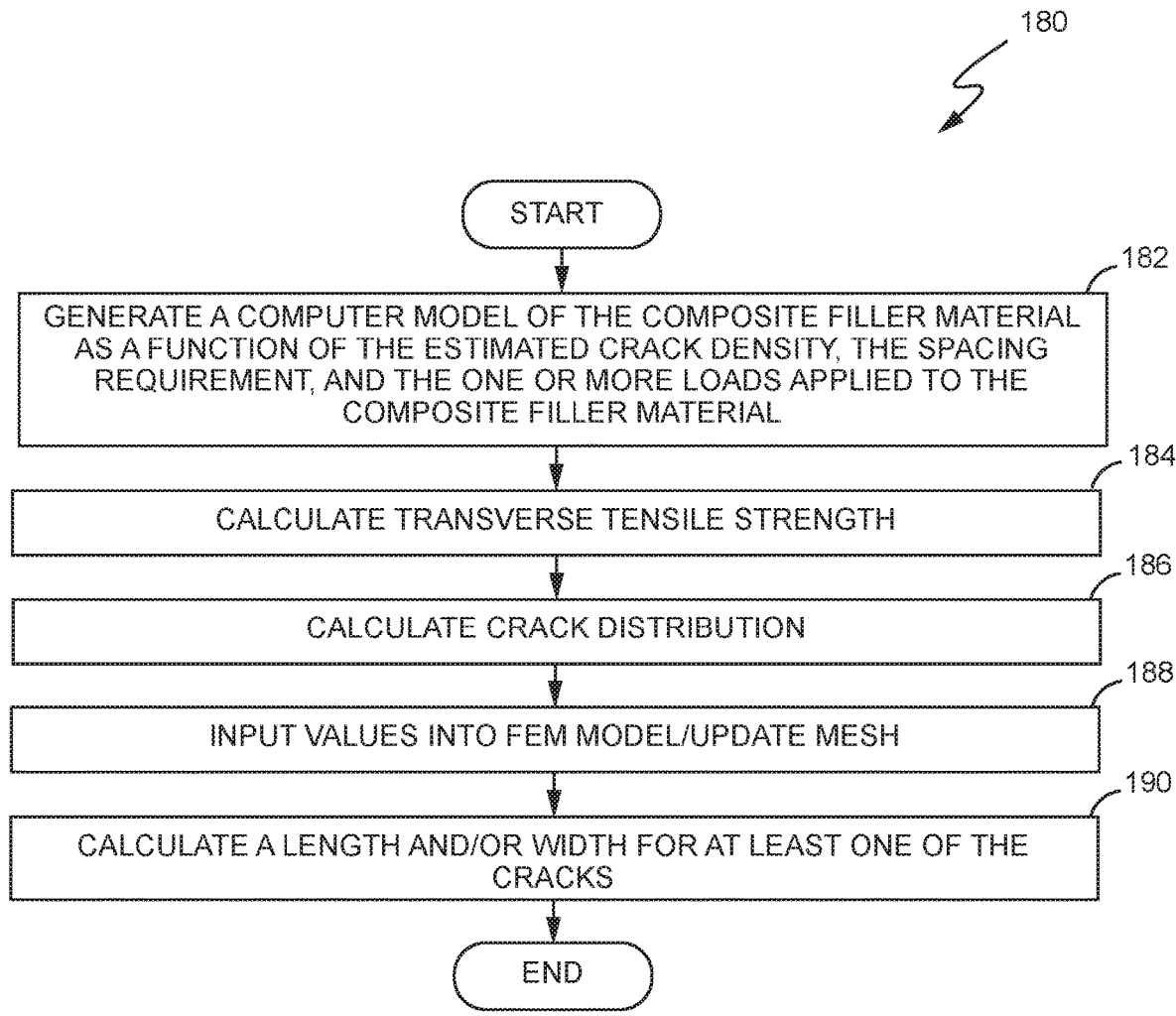
FIG. 14 is a flow diagram illustrating some example implementations for the progressive cracking values calculated in FIGS. 13A-13B.

As seen in FIG. 14, this aspect of the present disclosure also provides a method 180 for generating a computer model of the connection interface in addition to, or in lieu of, generating the visual representation. In this aspect, method 180 begins with generating the computer model of the connection interface comprising the composite filler material as a function of the estimated crack density, the spacing requirement, and the one or more loads that were applied to the selected sample of the composite filler material (box 182). Based on this generated computer model, and utilizing the previously described equations, computing device 70 can determine the transverse tensile strength of the composite filler material using, for example, equation (2) above (box 184), as well as the distribution of cracks in the composite filler material (box 186). In some aspects, the values associated with the generated computer model, including but not limited to, the transverse tensile strength and crack distribution, can also be input into an FEM analysis (box 188) and/or used to calculate a length and/or width of one or more of the cracks (box 190). In such aspects, for example, the values associated with the generated computer model can be utilized to generate and/or update a mesh on which the FEM is based.

Figure 15:
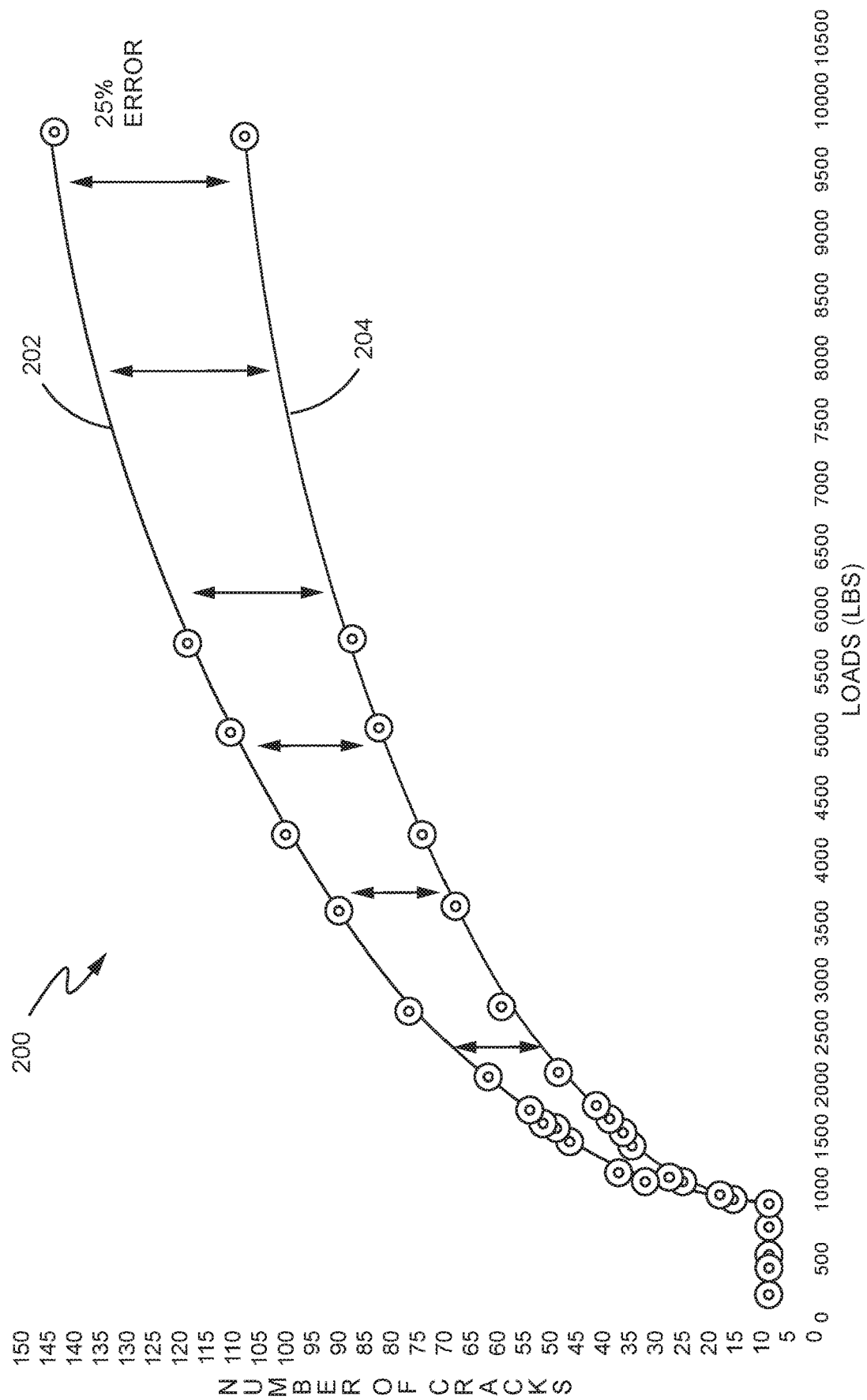
FIG. 15 is a graph illustrating an enhancement in identifying the number of hidden or embedded cracks in a composite filler material according to one or more aspects of the present disclosure.

As previously stated, a computing device 70 configured according to the aspects of the present disclosure are able to provide a more accurate estimation of the number of cracks that can be expected to appear in a composite filler material of a connection interface than can be provided using computing devices configured to utilize conventional tools. FIG. 15, for example, illustrates a graph 200 that plots a total number of cracks in a composite filler material, both visible and hidden, against an increasing load. The line 202 represents the number of cracks that were estimated and found using aspects of the present disclosure while line 204 represents the number of cracks that were estimated and found using conventional means. As seen in FIG. 15, there is a 25% increase in the number of cracks that were estimated and found by computing device 70 configured according to the present aspects than. This is because the aspects of the present disclosure enhance the capability of computing device 70 to estimate the number of "hidden" cracks in the composite filler material of a connection interface.

Figure 16C:
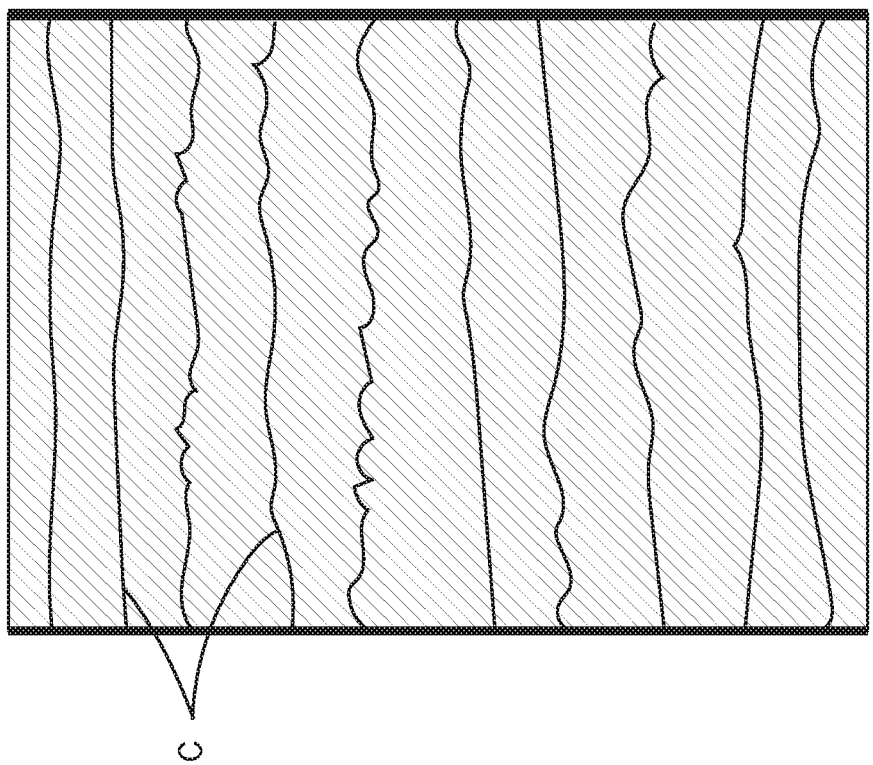
FIGS. 16A-16C illustrate different views (i.e., 3D, side, top, respectively) of a crossply laminate having embedded cracks that can be identified according to one or more aspects of the present disclosure.
Figure 16B:
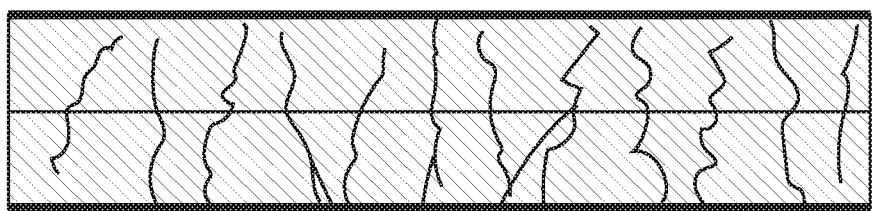
Figure 16A:
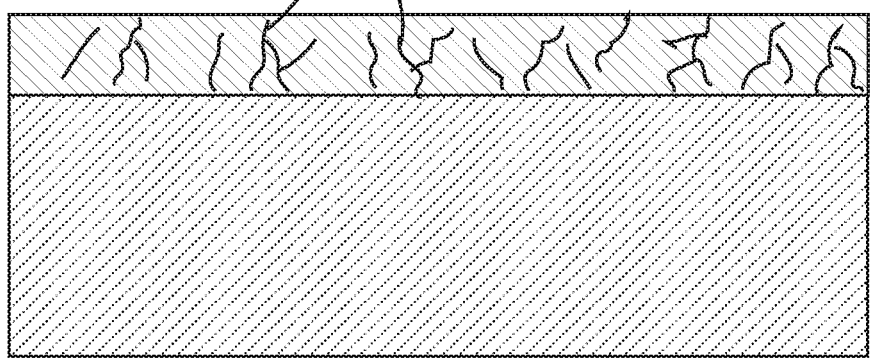

FIGS. 16A-16C illustrate the visual representations of a composite filler material generated according to one aspect of the present disclosure as previously described. In particular, FIG. 16A illustrates a 3-dimensional view of the composite filler material, FIG. 16B illustrates a side-view of the composite filler material, and FIG. 16C illustrates a top-view of the composite filler material. As seen in these figures, the "hidden" or "embedded" cracks $C_E$ are clearly visible (FIGS. 16A-16B) as well as cracks C that are not "hidden" or "embedded" (FIG. 16C).

Figure 17:
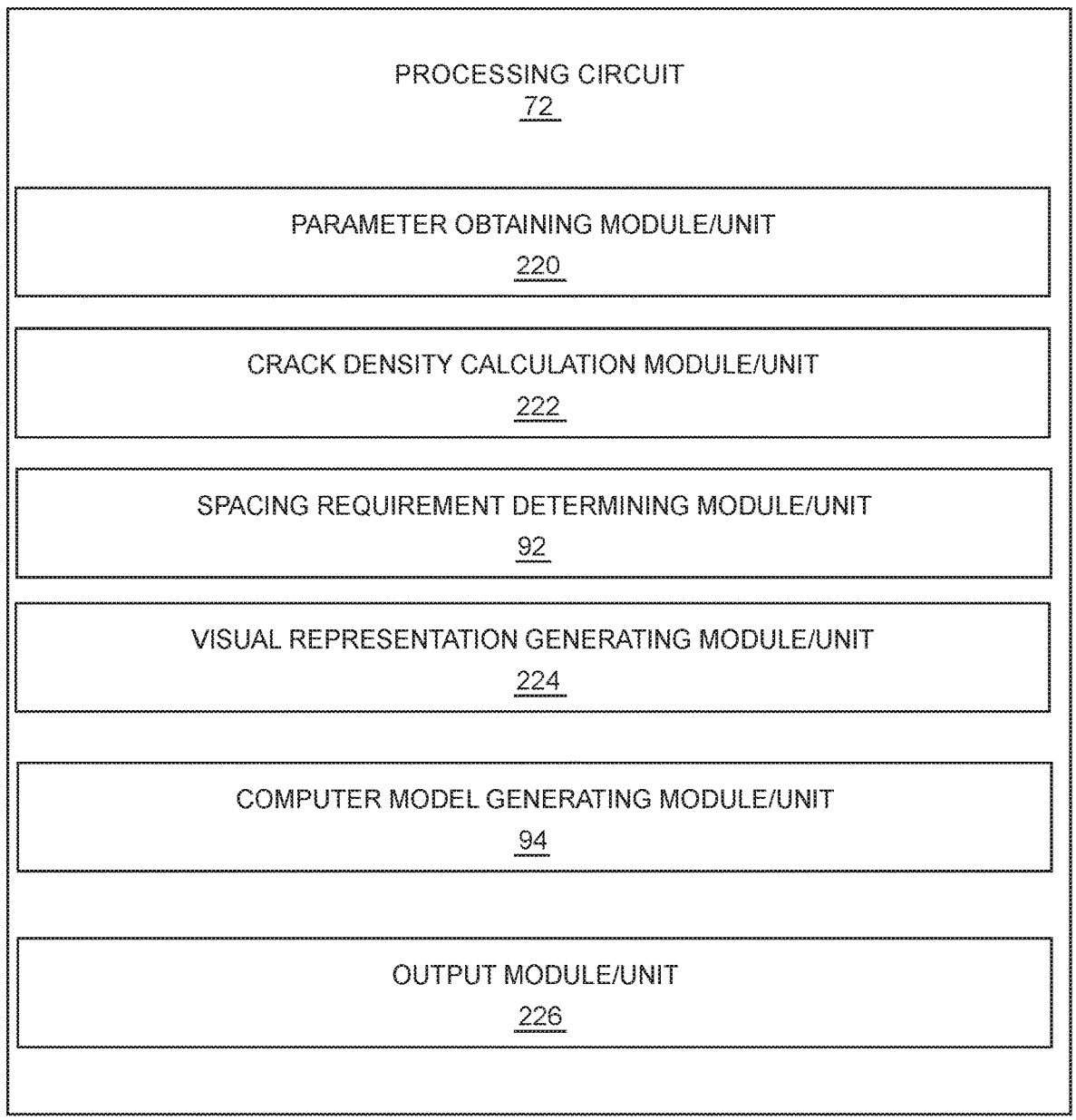
FIG. 17 is a block diagram illustrating example processing circuitry according to one or more aspects of the present disclosure.

FIG. 17 is a schematic block diagram illustrating processing circuitry 72 implemented according to different hardware units and software modules (e.g., as control program 76 stored in memory 74) according to one aspect of the present disclosure. As seen in FIG. 17, processing circuitry 72 implements a parameter obtaining module/unit 220, a crack density calculation module/unit 222, the spacing requirement determining unit/module 92 previously described, a visual representation generating module/unit 224, the computer model generating unit/module 94 previously described, and the output module/unit 226.

The parameter obtaining module/unit 220 is configured to obtain one or more parameters representing characteristics of a composite filler material, as previously described. In some aspects, for example, the parameter obtaining module/unit 220 obtains the parameters via user input, while in other aspects, the parameter obtaining module/unit 220 retrieves the parameters from a memory. The crack density calculation module unit 222 is configured to utilize the previously described equations to calculate a crack density for the cracks that progressively appear in the composite filler material. The spacing requirement determining unit/module 92 is configured to calculate a spacing requirement for the cracks in the connection interface of interest based at least partially on the actual crack density. As above, the spacing requirement determining unit/module 92 is configured to calculate the spacing requirement in some aspects based on the crack density requirement without considering any residual stresses. In other aspects, the spacing requirement determining unit/module 92 is configured to calculate the spacing requirements based on both the crack density requirement and one or more residual stresses.

The visual representation generating module/unit 224 is configured to generate a visual representation of the composite filler material to visually indicate the cracks in a composite filler material. The computer model generating unit/module 94 is configured to generate the computer model, while the output module/unit 226 is configured to output one or both of the visual representation of the composite filler material generated by the visual representation generating module/unit and the computer model generated by the computer model generating unit/module 94. In one aspect, the visual representation of the composite filler material comprises a plurality of different generated views that are output by the output module/unit 226, such as those seen in FIGS. 16A-16C, to better illustrate the number and distribution of cracks C and $C_E$ to a user. In one aspect, the generated computer model comprises values and information that the output module/unit 98 uses to generate the computer model. In these aspects, the output module/unit 98 outputs the computer model to a display device. In other aspects, however, the output module/unit 98 outputs the values and information comprising the computer model as input into a FEM function so that a computer device can perform a finite element analysis according to the generated computer model.

Aspects of the present disclosure further include various methods and processes, as described herein, implemented using various hardware configurations configured in ways that vary in certain details from the broad descriptions given above. For instance, one or more of the processing functionalities discussed above may be implemented using dedicated hardware, rather than a microprocessor configured with program instructions, depending on, e.g., the design and cost tradeoffs for the various approaches, and/or system-level requirements.

Figure 18:
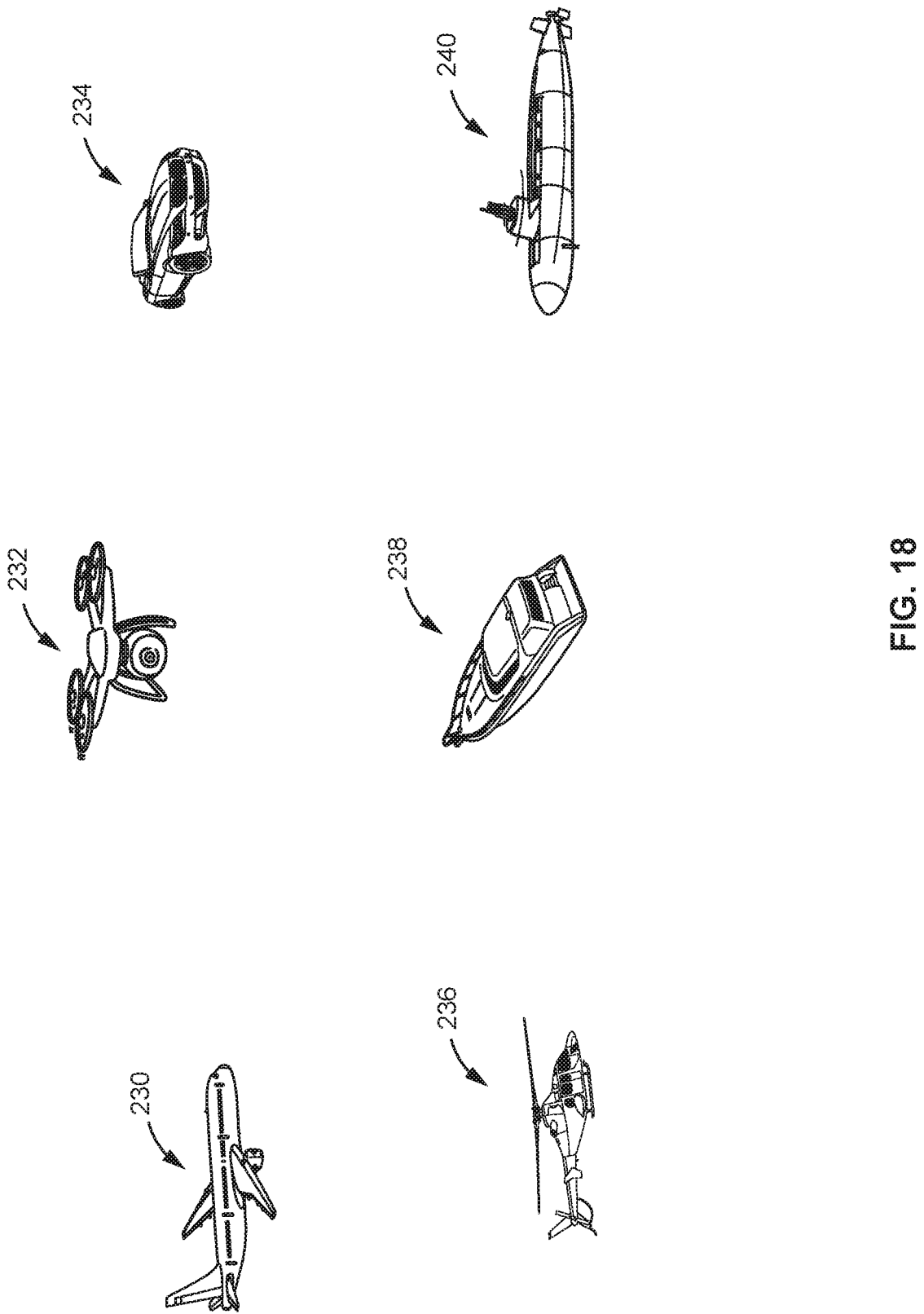
FIG. 18 illustrates some example vehicles suitable for use with aspects of the present disclosure.

It should also be noted that the previous aspects describe the present disclosure in the context of a noodle in use on an aircraft, such as the aircraft 230 seen in FIG. 18. However, this is for illustrative purposes only. Those of ordinary skill in the art will readily appreciate that aspects of the present disclosure are also well-suited for connection interfaces used on other types of vehicles as well. FIG. 18 illustrates these other vehicles as including, but not limited to, unmanned and/or remotely controlled aircraft 232, automobiles that utilize fossil fuels 234, rotorcraft 236 such as helicopters, surface craft 238 such as boats, and submersible craft 240 such as submarines.

Those of ordinary skill in the art will also appreciate that the present disclosure is not limited solely to stringers or any other particular type of connection interface. Rather, aspects of the present disclosure can be applied to other composite components, such as spars, for example, and include various other types of connection interfaces such as tape-to-tape and the like.

Thus, the foregoing description and the accompanying drawings represent non-limiting examples of the methods and apparatus taught herein. As such, the aspects of the present disclosure are not limited by the foregoing description and accompanying drawings. Instead, the aspects of the present disclosure are limited only by the following claims and their legal equivalents.

What is claimed is:

1. A computer configured to determine progressive cracking in a connection interface the computer comprising:
a communication interface circuit configured to communicate data with a remote device via a communications network;
and processing circuitry operatively connected to the communication interface circuit and configured to:
obtain, from a radiological scan of a sample of a composite filler material comprised in a connection interface integrated into a structural framework of an aircraft and configured to be disposed between first and second load-bearing composite structural components on the aircraft, corresponding values for one or more parameters representing characteristics of progressive cracking in the composite filler material, wherein during the radiological scan, the composite filler material was subjected to an increasing load over a predetermined time period, and wherein the one or more parameters comprise:
an actual crack density for the composite filler material, wherein the actual crack density defines a number of cracks in the connection interface when at least one of the first and second load-bearing composite structural components begins to delaminate;
a total number of embedded cracks in the composite filler material, wherein an embedded crack comprises a crack having at least one terminating end between opposing exterior surfaces of the composite filler material;
and a distribution of the cracks in the composite filler material;
calculate a spacing requirement for the cracks in the composite filler material, wherein the spacing requirement defines an average spacing for the cracks in the composite filler material and is based at least partially on the actual crack density;
generate an initial computer model of the composite filler material as a function of the spacing requirement and an Interlaminar Shear (ILS) strength of the composite filler material;
iteratively generate a refined computer model of the composite filler material as a function of the spacing requirement and the ILS strength of the composite filler material, wherein to iteratively generate the refined computer model, the processing circuitry is further configured to:
determine whether the initial computer model indicates that the at least one of the first and second load-bearing composite structural components on the aircraft have started to delaminate;
responsive to determining that the initial computer model does not indicate that the at least one of the first and second load-bearing composite structural components on the aircraft have started to delaminate:
increment the ILS strength of the composite filler material by a predetermined amount;
and generate the refined computer model of the composite filler material based on the spacing requirement and the incremented ILS strength, wherein the refined computer model indicates a placement and a predicted density of the cracks in the composite filler material;
responsive to determining that the refined computer model indicates that the at least one of the first and second load-bearing composite structural components on the aircraft have started to delaminate, identify the incremented ILS strength as a target ILS strength for the composite filler material;
and output the refined computer model for a user, wherein the refined computer model comprises a visual representation of the composite filler material graphically indicating the cracks in the composite filler material between the first and second load-bearing composite structural components.

2. The computer of claim 1, wherein the processing circuitry is further configured to generate the refined computer model to graphically indicate the predicted crack density.

3. The computer of claim 1, wherein the processing circuitry is further configured to output the refined computer model as input into a finite element method (FEM) function executing on a computing device.

4. The computer of claim 3, wherein the processing circuitry is further configured to refine a mesh of the FEM function based on the refined computer model.

5. The computer of claim 1, wherein the processing circuitry is further configured to compare a density of the cracks in the computer model of the composite filler material to a baseline crack density, and wherein the ILS strength of the composite filler material is incremented responsive to determining that the density of the cracks does not match the baseline crack density.

6. The computer of claim 1, wherein to calculate the spacing requirement for the predicted cracks, the processing circuitry is further configured to:
determine to include a residual stress exerted on the composite filler material in the calculation for the spacing requirement, wherein the residual stress comprises a stress that was exerted on the composite filler material during a curing process;
and responsive to determining that the residual stress is to be included, calculate the spacing requirement based on the actual crack density and one or more residual stress values.

7. The computer of claim 1, wherein the radiological scan is an in-situ scan of the composite filler material, and wherein the processing circuitry is further configured to determine the value for a width measurement for a crack in the composite filler material based on a number of pixels that represents the crack.

8. The computer of claim 1, wherein the processing circuitry is further configured to generate the initial computer model of the composite filler material as a function of an estimated crack density.

9. The computer of claim 1, wherein the processing circuitry is further configured to:
calculate the spacing requirement for the cracks in the composite filler material based on at least two of the one or more parameters;
and determine a length for at least one of the cracks in the composite filler material.

10. The computer of claim 1:
wherein the one or more parameters further comprise a width measurement for a crack in the composite filler material, the width measurement specifying a measured width value for the crack in the composite filler material;
and wherein the processing circuitry is further configured to calculate an estimated crack density for the composite filler material, the estimated crack density defining an estimated number of cracks in the composite filler material relative to the increasing load that was applied to the composite filler material during the radiological scan.

11. A method for determining progressive cracking in a connection interface, the method comprising:
obtaining, from a radiological scan of a sample of a composite filler material comprised in a connection interface integrated into a structural framework of an aircraft and configured to be disposed between first and second load-bearing composite structural components on the aircraft, corresponding values for one or more parameters representing characteristics of progressive cracking in the composite filler material, wherein during the radiological scan, the composite filler material was subjected to an increasing load over a predetermined time period, and wherein the one or more parameters comprise:
an actual crack density for the composite filler material, wherein the actual crack density defines a number of cracks in the connection interface when at least one of the first and second load-bearing composite structural components begins to delaminate;
a total number of embedded cracks in the composite filler material, wherein an embedded crack comprises a crack having at least one terminating end between opposing exterior surfaces of the composite filler material;
and a distribution of the cracks in the composite filler material;
determining a spacing requirement for the cracks in the composite filler material, wherein the spacing requirement defines an average spacing between the cracks in the composite filler material and is based at least partially on the actual crack density;
generating an initial computer model of the composite filler material as a function of the spacing requirement and an Interlaminar Shear (ILS) strength of the composite filler material;
iteratively generating a refined computer model of the composite filler material as a function of the spacing requirement and the ILS strength of the composite filler material, wherein iteratively generating the refined computer model comprises:
determining whether the initial computer model indicates that the at least one of the first and second load-bearing composite structural components on the aircraft have started to delaminate;
responsive to determining that the initial computer model does not indicate that the at least one of the first and second load-bearing composite structural components on the aircraft have started to delaminate:
incrementing the ILS strength of the composite filler material by a predetermined amount;
and generating the refined computer model of the composite filler material based on the spacing requirement and the incremented ILS strength, wherein the refined computer model indicates a placement and a predicted density of the cracks in the composite filler material;
responsive to determining that the refined computer model indicates that the at least one of the first and second load-bearing composite structural components on the aircraft have started to delaminate, identifying the incremented ILS strength as a target ILS strength for the composite filler material;
and outputting the refined computer model for a user, wherein the refined computer model comprises a visual representation of the composite filler material graphically indicating the cracks in the composite filler material between the first and second load-bearing composite structural components.

12. The method of claim 11, wherein the refined computer model is generated to further graphically indicate the predicted crack density.

13. The method of claim 11, wherein outputting the refined computer model for the user comprises outputting the refined computer model as input into a finite element method (FEM) function executing on a computing device.

14. The method of claim 13, further comprising refining a mesh of the FEM function based on the refined computer model.

15. The method of claim 11, further comprising comparing the density of the cracks in the computer model of the composite filler material to a baseline crack density, and wherein the ILS strength of the composite filler material is incremented responsive to determining that the density of the cracks does not match the baseline crack density.

16. The method of claim 11, wherein at least one of one or more loads to be applied to the composite filler material comprises one or both of a residual stress exerted on the composite filler material during a curing process, and a mechanical load exerted on the composite filler material.

17. The method of claim 11, wherein calculating the spacing requirement for the predicted cracks comprises:
determining to include a residual stress exerted on the composite filler material in the calculation for the spacing requirement, wherein the residual stress comprises a stress that was exerted on the composite filler material during a curing process;
and responsive to determining that the residual stress is to be included, calculating the spacing requirement based on the actual crack density and one or more residual stress values.

18. The method of claim 17, wherein determining whether to include the residual stress exerted on the composite filler material in the calculation for the spacing requirement is based on an indication received from a Graphical User Interface.

19. The method of claim 11:
wherein the one or more parameters further comprise a width measurement for a crack in the composite filler material, the width measurement specifying a measured width value for the crack in the composite filler material;

and wherein the method further comprises calculating an estimated crack density for the composite filler material, the estimated crack density defining an estimated number of cracks in the composite filler material relative to the increasing load that was applied to the composite filler material during the radiological scan.

20. A non-transitory computer-readable medium comprising instructions stored thereon that, when executed by processing circuitry of a computing device configured to determine progressive cracking in a connection interface, configure the computing device to:

obtain, from a radiological scan of a sample of a composite filler material comprised in a connection interface integrated into a structural framework of an aircraft and configured to be disposed between first and second load-bearing composite structural components on the aircraft, corresponding values for one or more parameters representing characteristics of progressive cracking in the composite filler material, wherein during the radiological scan, the composite filler material was subjected to an increasing load over a predetermined time period, and wherein the one or more parameters comprise:

an actual crack density for the composite filler material, wherein the actual crack density defines a number of cracks in the connection interface when at least one of the first and second load-bearing composite structural components begins to delaminate;

a total number of embedded cracks in the composite filler material, wherein an embedded crack comprises a crack having at least one terminating end between opposing exterior surfaces of the composite filler material;

and a distribution of the cracks in the composite filler material;

determine a spacing requirement for the cracks in the composite filler material, wherein the spacing requirement defines an average spacing between the cracks in the composite filler material and is based at least partially on the actual crack density;

generate an initial computer model of the composite filler material as a function of the spacing requirement and an Interlaminar Shear (ILS) strength of the composite filler material;

iteratively generate a refined computer model of the composite filler material as a function of the spacing requirement and the ILS strength of the composite filler material, wherein to iteratively generate the refined computer model, the instructions, when executed by the processing circuitry, further configure the computing device to:

determine whether the initial computer model indicates that the at least one of the first and second load-bearing composite structural components on the aircraft have started to delaminate;

responsive to determining that the initial computer model does not indicate that the at least one of the first and second load-bearing composite structural components on the aircraft have started to delaminate:

increment the ILS strength of the composite filler material by a predetermined amount;

and generate the refined computer model of the composite filler material based on the spacing requirement and the incremented ILS strength, wherein the refined computer model indicates a placement and a predicted density of the cracks in the composite filler material;

responsive to determining that the refined computer model indicates that the at least one of the first and second load-bearing composite structural components on the aircraft have started to delaminate, identify the incremented ILS strength as a target ILS strength for the composite filler material;

and output the refined computer model for a user, wherein the refined computer model comprises a visual representation of the composite filler material graphically indicating the cracks in the composite filler material between the first and second load-bearing composite structural components.

* * * * *